US007970239B2

(12) United States Patent  (10) Patent No.: US 7,970,239 B2
Quan et al.  (45) Date of Patent: Jun. 28, 2011

(54) HAND JITTER REDUCTION COMPENSATING FOR ROTATIONAL MOTION

(75) Inventors: Shuxue Quan, San Diego, CA (US); Xiaoyun Jiang, San Diego, CA (US); Jingqiang Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1258 days.

(21) Appl. No.: 11/534,935

(22) Filed: Sep. 25, 2006

(65) Prior Publication Data

US 2007/0172150 A1    Jul. 26, 2007

Related U.S. Application Data

(60) Provisional application No. 60/760,768, filed on Jan. 19, 2006.

(51) Int. Cl.
*G06K 9/36* (2006.01)
*G06K 9/32* (2006.01)

(52) U.S. Cl. ........ 382/289; 382/154; 382/276; 382/296; 382/297; 382/298

(58) Field of Classification Search .............. 382/154, 382/289, 296–298
See application file for complete search history.

(56) References Cited

U.S. PATENT DOCUMENTS

| | | | |
|---|---|---|---|
| 4,446,521 A * | 5/1984 | Inouye | 378/14 |
| 4,845,766 A * | 7/1989 | Peppers et al. | 382/214 |
| 4,922,543 A * | 5/1990 | Ahlbom et al. | 382/291 |
| 5,018,216 A | 5/1991 | Kojima | |
| 5,262,856 A * | 11/1993 | Lippman et al. | 375/240.12 |
| 5,745,808 A | 4/1998 | Tintera | |
| 5,832,101 A * | 11/1998 | Hwang et al. | 382/107 |
| 5,832,110 A * | 11/1998 | Hull | 382/168 |
| 5,943,450 A | 8/1999 | Hwang | |

(Continued)

FOREIGN PATENT DOCUMENTS

JP    2000047297    2/2000

(Continued)

OTHER PUBLICATIONS

International Search Authority—PCT/US07/0606808—International Search Authority—European Patent Office, Dec. 27, 2007.

(Continued)

*Primary Examiner* — Bhavesh M Mehta
*Assistant Examiner* — Gandhi Thirugnanam
(74) *Attorney, Agent, or Firm* — Alex C. Chen; Espartaco Diaz Hidalgo

(57) ABSTRACT

The registration of images comprising segmenting an image in a frame into a set of sectors which forms a circle. Generating a plurality of sets of projections in a base frame, wherein each set of projections is generated from any sector amongst the set of sectors from the base frame. Also generating a plurality of sets of projections in a movement frame, wherein each set of projections is generated from any sector amongst the set of sectors from the movement frame. Then summing each set of projections, from any sector amongst the set of sectors from the base frame and summing each set of projections from any sector amongst the set of sectors from the movement frame. Furthermore, comparing a set of each sum of projections from the base frame with a set of each sum of projections from the movement frame, and generating a rotation angle estimate to add to the base frame.

34 Claims, 18 Drawing Sheets

U.S. PATENT DOCUMENTS

| | | | |
|---|---|---|---|
| 6,005,981 | A | 12/1999 | Ng et al. |
| 6,128,047 | A * | 10/2000 | Chang et al. .................. 348/699 |
| 6,160,900 | A | 12/2000 | Miyawaki et al. |
| 6,166,370 | A * | 12/2000 | Sayag ........................... 250/221 |
| 6,243,419 | B1 | 6/2001 | Satou et al. |
| 6,285,711 | B1 | 9/2001 | Ratakonda et al. |
| 6,310,985 | B1 * | 10/2001 | White ........................... 382/289 |
| 6,381,279 | B1 * | 4/2002 | Taubman ................. 375/240.18 |
| 6,418,168 | B1 * | 7/2002 | Narita ..................... 375/240.16 |
| 6,522,712 | B1 * | 2/2003 | Yavuz et al. ....................... 378/4 |
| 6,693,673 | B1 | 2/2004 | Tanaka et al. |
| 6,750,903 | B1 | 6/2004 | Miyatake et al. |
| 6,873,360 | B1 | 3/2005 | Kawashiri |
| 6,879,656 | B2 * | 4/2005 | Cesmeli et al. ..................... 378/4 |
| 6,996,176 | B1 * | 2/2006 | Chang et al. ............. 375/240.16 |
| 6,996,254 | B2 * | 2/2006 | Zhang et al. ................. 382/107 |
| 7,057,645 | B1 | 6/2006 | Hara et al. |
| 7,065,261 | B1 * | 6/2006 | Horie ........................... 382/289 |
| 7,414,648 | B2 | 8/2008 | Imada |
| 7,672,503 | B2 * | 3/2010 | Morisada et al. ............ 382/153 |
| 2001/0033693 | A1 | 10/2001 | Seol et al. |
| 2002/0097904 | A1 * | 7/2002 | White ........................... 382/151 |
| 2002/0164075 | A1 | 11/2002 | Acharya et al. |
| 2003/0044048 | A1 * | 3/2003 | Zhang et al. ................. 382/107 |
| 2003/0223010 | A1 | 12/2003 | Kaplinsky et al. |
| 2004/0056966 | A1 | 3/2004 | Schechner et al. |
| 2004/0114831 | A1 * | 6/2004 | Notovitz et al. ............. 382/296 |
| 2004/0125908 | A1 * | 7/2004 | Cesmeli et al. ..................... 378/4 |
| 2004/0145673 | A1 * | 7/2004 | Washisu ........................ 348/364 |
| 2004/0160525 | A1 | 8/2004 | Kingetsu et al. |
| 2004/0170246 | A1 * | 9/2004 | Koenig et al. ..................... 378/4 |
| 2004/0239775 | A1 * | 12/2004 | Washisu ........................ 348/239 |
| 2005/0036558 | A1 | 2/2005 | Dumitras et al. |
| 2005/0056699 | A1 | 3/2005 | Meier et al. |
| 2005/0094901 | A1 | 5/2005 | Seol et al. |
| 2005/0166054 | A1 * | 7/2005 | Fujimoto ...................... 713/176 |
| 2005/0195221 | A1 | 9/2005 | Berger et al. |
| 2005/0232494 | A1 * | 10/2005 | Fan ................................ 382/224 |
| 2006/0274156 | A1 | 12/2006 | Rabbani et al. |
| 2007/0166020 | A1 * | 7/2007 | Quan et al. ...................... 396/52 |
| 2007/0171981 | A1 * | 7/2007 | Qi ............................. 375/240.24 |
| 2007/0172150 | A1 * | 7/2007 | Quan et al. ................... 382/298 |
| 2007/0236579 | A1 * | 10/2007 | Li et al. .................... 348/208.99 |
| 2007/0237514 | A1 * | 10/2007 | Pillman et al. ................ 396/153 |
| 2008/0165280 | A1 | 7/2008 | Deever et al. |
| 2008/0292171 | A1 * | 11/2008 | Bruder et al. ................. 382/131 |
| 2009/0123082 | A1 | 5/2009 | Atanssov et al. |
| 2010/0171837 | A1 | 7/2010 | Pillman et al. |

FOREIGN PATENT DOCUMENTS

| | | |
|---|---|---|
| JP | 2000224470 | 8/2000 |
| JP | 2004357202 | 12/2004 |
| WO | 8603866 | 7/1986 |

OTHER PUBLICATIONS

Written Opinion—PCT/US07/0606808—International Search Authority—European Patent Office, Dec. 27, 2007.

International Preliminary Report on Patentability—PCT/US07/0606808—The International Bureau of WIPO. Geneva. Switzerland—07-22-087-07.

Huafu et al., "A Projection-Based Image Registration Algorithm and Its Application", Brain-Topography, Klumer Academic Publishers-Plenum Publishers, NE, vol. 18, np. 1, Sep. 1, 2005, pp. 47-58, XP 019274484, ISSN: 1573-6792.

Sauer et al., "Efficient Block Motion Estimation Using Integral Projections", IEEE Transactions on Circuits and Systems for Video Technology, IEEE Service Center, Piscataway, NJ, US, vol. 6, No. 5, Oct. 1996, XP011014326, ISSN: 1051-8215, p. 514, right hand column.

Sung Cheol Park, et al., Super-Resolution Image Reconstruction: IEEE Signal Processing Magazine (May 2003).

Ben-Ezra, et al., Motion Deblurring Using Hybrid Imaging: IEEE Computer Society Conference on Computer Vision and Pattern Recognition (CVPR'03).

Xing Yu Qi, et al., Motion Deblurring for Optical Character Recognition: IEEE Computer Society Conference on Computer Vision and Pattern Recognition (ICDAR'05).

Moshe Ben-Ezra, et al., Motion-Based Motion Deblurring: IEEE Transactions on Pattern Analysis and Machine Intelligence, vol. 26 No. 6 (Jun. 2004).

Cain, S. et al.: "Projection-Based Image Registration in the Presence of Fixed-Pattern Noise," IEEE Transactions on Image Processing, vol. 10, No. 12, pp. 1860-1861, (Dec. 2001), XP011025877, ISSN: 1057-7149.

Joon-Seek Kim et al: "A Fast Feature-Based Block Matching Algorithm Using Integral Projections" IEEE Journal on Selected Areas in Communications, IEEE Service Center, Piscataway, US, vol. 10, No. 5, Jun. 1, 1992, pp. 968-971, XP000276102 ISSN: 0733-8716 pp. 969-970.

* cited by examiner

HAND JITTER REDUCTION COMPENSATING FOR ROTATIONAL MOTION

CROSS-RELATED APPLICATIONS

This application claims the benefit of provisional U.S. Application Serial No. 60/760,768, entitled "HAND JITTER REDUCTION SYSTEM DESIGN," filed Jan. 19, 2006. This disclosure is related to co-pending patent application Ser. No. 11/534,993, entitled "A HAND JITTER REDUCTION SYSTEM FOR CAMERAS," and co-pending patent application Ser. No. 11/534,808, entitled "HAND JITTER REDUCTION FOR COMPENSATING FOR LINEAR DISPLACEMENT," both co-filed with this application on Sep. 25, 2006.

TECHNICAL FIELD

This disclosure relates to digital image processing and, more particularly, hand jitter reduction compensating for rotational motion.

BACKGROUND

The demand for multimedia applications in mobile communications has been growing at an astounding rate. Today, a user can send and receive still images, as well as download images and video from the Internet, for viewing on a mobile unit or handset. The integration of the digital camera into the mobile unit has further contributed to the growing trend in mobile communications for multimedia functionality.

Given the limited amount of resources like battery capacity, processing power, and transmission speed associated with a mobile unit, effective digital imaging processing techniques are needed to support multimedia functions. This requires the development of more sophisticated hardware and software that reduces computational complexity for multimedia applications while maintaining the image quality. The development of such hardware and software leads to lower power consumption and longer standby time for the mobile unit.

One facet of the digital imaging process involves removing blurriness from a picture. Blurriness may be caused by hand jitter. Hand jitter is caused by the movement of the user's hand when taking a digital picture with a camera. Even if the user is unaware of the movement, the hand may be continually moving. The movements are relatively small, but if the movements are large relative to the exposure time, the digital picture may be blurry. An object or person in the picture may appear to be moving. Blurriness may also be caused by an object/person moving when a picture is being taken. Blurriness may also be caused by limitations of the optical system used to capture the pictures.

Under low lighting conditions, a digital camera, for example, one found in a mobile unit, takes a longer time to register a picture. The longer exposure time increases the probability that the slight movements produced by the hand may lead to blurriness. Similarly, the longer exposure time increases the chance that the movement by the object/person may be large relative to the exposure time.

Current techniques for compensating for camera movements involve the use of small gyroscopes or other mechanical devices. None of the techniques seem to have an acceptable way to digitally compensate for the camera movements, especially under low lighting conditions. It would be desirable to reduce the amount of blurriness in a digital picture with efficient processing resources suitable for mobile applications under all conditions.

SUMMARY

The details of one or more configurations are set forth in the accompanying drawings and the description below. Other features, objects, and advantages will be apparent from the description, drawings and claims.

Multiple frame registration may be implemented by capturing multiple frames and checking the parity of the frames to determine how to register them. Registration takes place between a base frame and a movement frame. As part of the registration, a region of interest may be identified. A region of interest locator may segment a circle into a set of K sectors. A projection generator may generate a horizontal (or vertical) projection for any $L^{th}$ row (or column) of a sector. A projection is the summing of pixels in a column or row in a sector. The projections in each sector may be formed and summed. Each $k^{th}$ sum of projections is represented by $S_\theta(k)$. The set or subset (if a coarser calculation is used) of a sum of projections, i.e., $\{S_\theta(0), S_\theta(1), \ldots S_\theta(K-1)\}$, may be represented by a vector, and is denoted as $\overline{S_\theta}$. Vectors $\overline{S_\theta}$ from a base frame and vector $\overline{S'_\theta}$ from a movement frame may be input into a projection correlator. The minimum projection correlation may be used to select the rotation angle estimate between the base and movement frames. Frame registration may be an iterative process which may be terminated if the rotation angle estimate is within a certain tolerance and cause an early exit condition and terminate the frame registration earlier than the processing of N processed frames. Frame registration also may be governed by the parity of the N processed frames.

One of the advantages of multiple frame registration is to reduce noise and blurriness due to rotational movements as a result of hand jitter in a digital picture.

BRIEF DESCRIPTION OF DRAWINGS

Various embodiments are illustrated by way of example, and not by way of limitation, in the accompanying drawings.

Figure 6A:
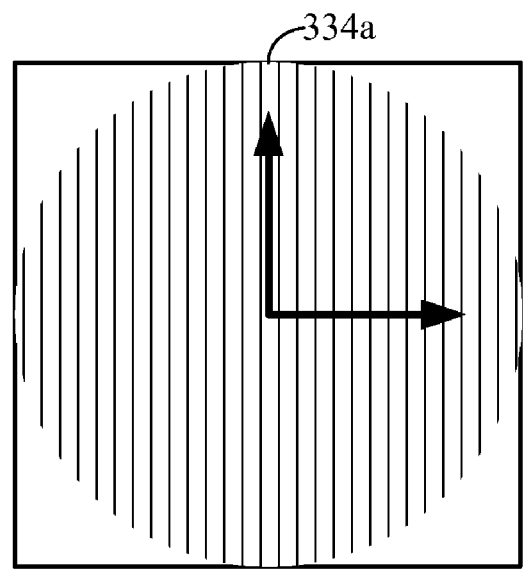
Figure 6B:
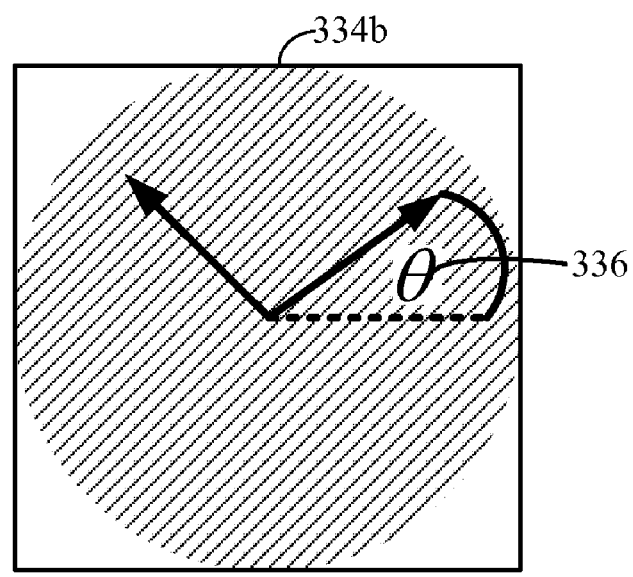

A region of interest (ROI) in a base frame, and a region of interest (ROI) in a movement frame 334b are illustrated in FIG. 6A and FIG. 6B, respectively.

Figure 7A:
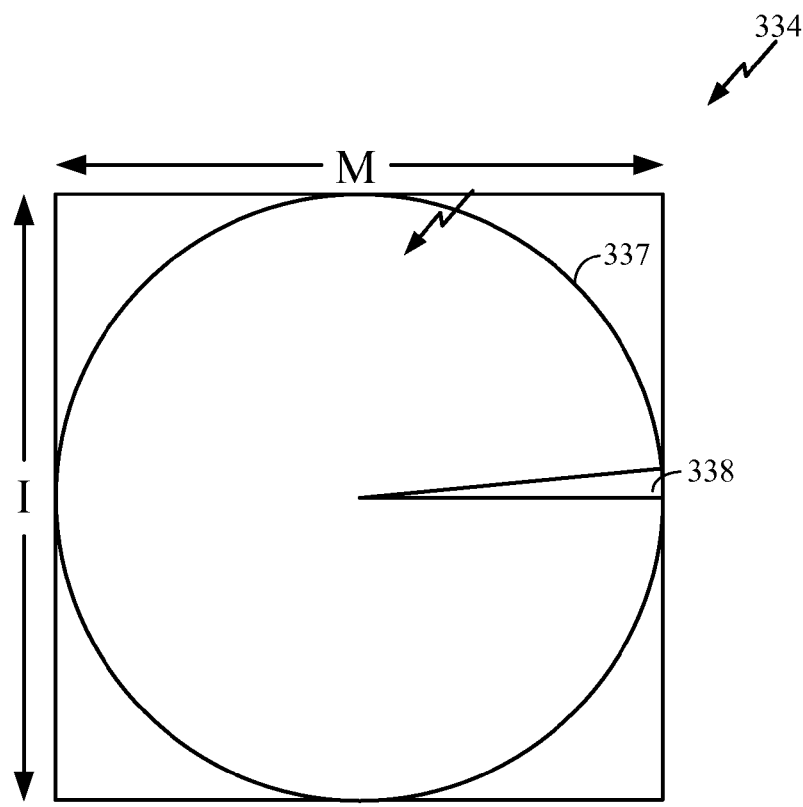

A frame may have M columns and I rows, as illustrated in FIG. 7A.

Figure 7B:
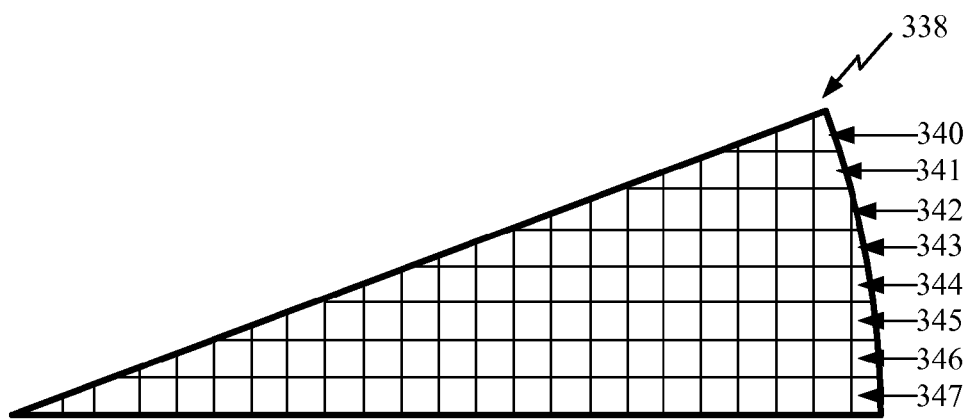

FIG. 7B, illustrates multiple rows and columns of a sector.

Figure 8:
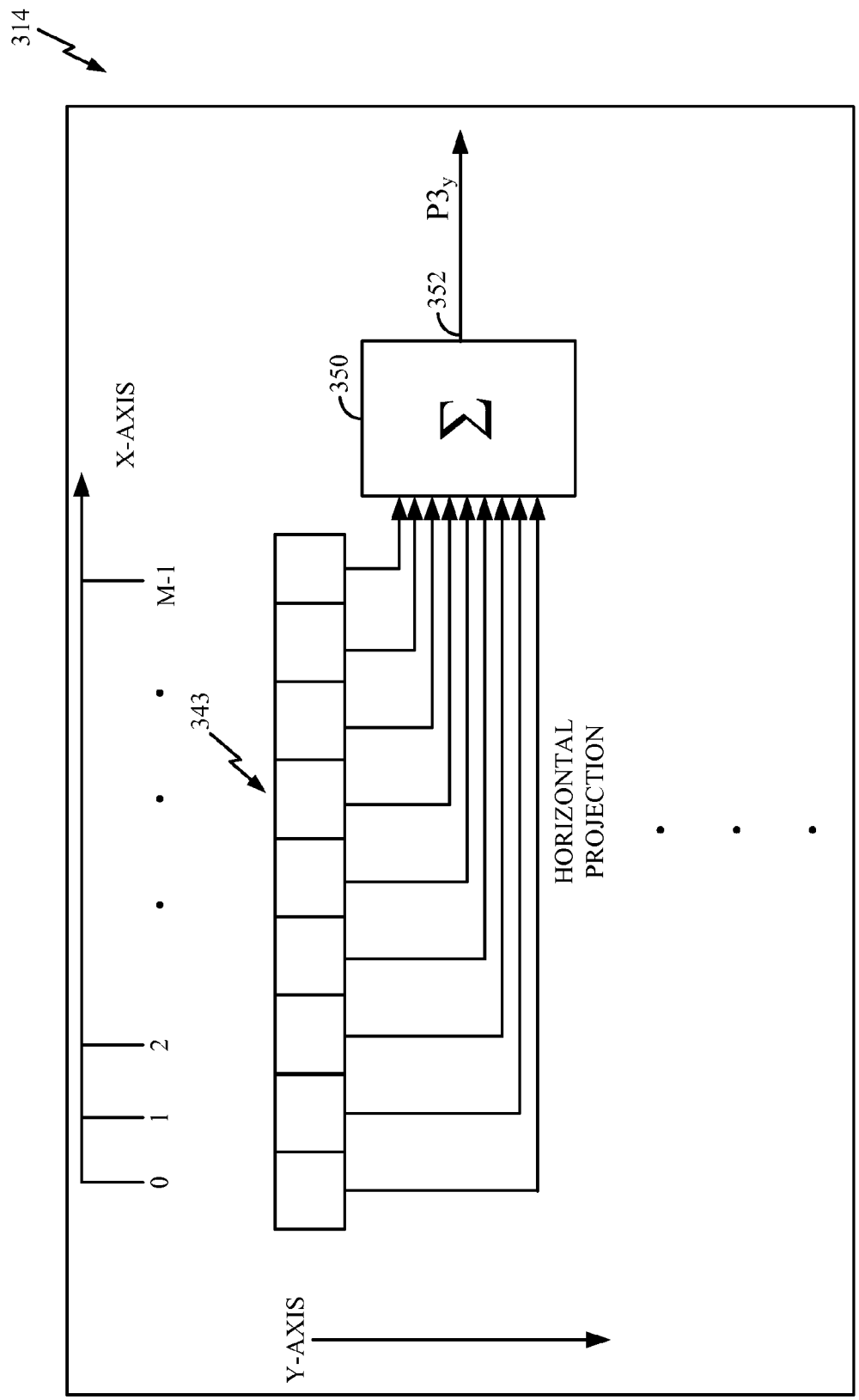

FIG. 8 illustrates a projection generator that may generate horizontal projections.

Figure 9:
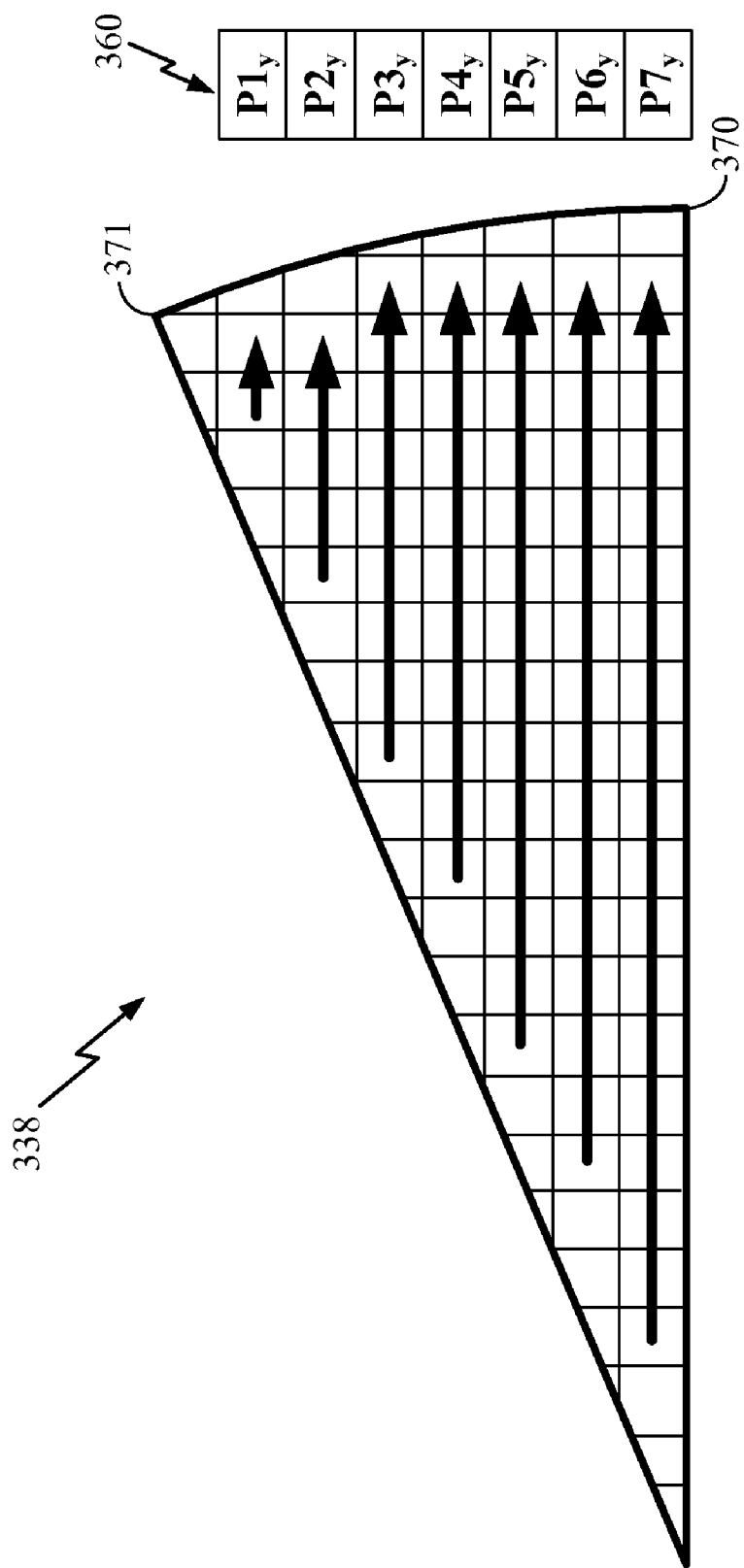

FIG. 9 illustrates each projection by a horizontal line, with an arrow tip, spanning the whole pixels in each row, where the projection is generated over.

Figure 10:
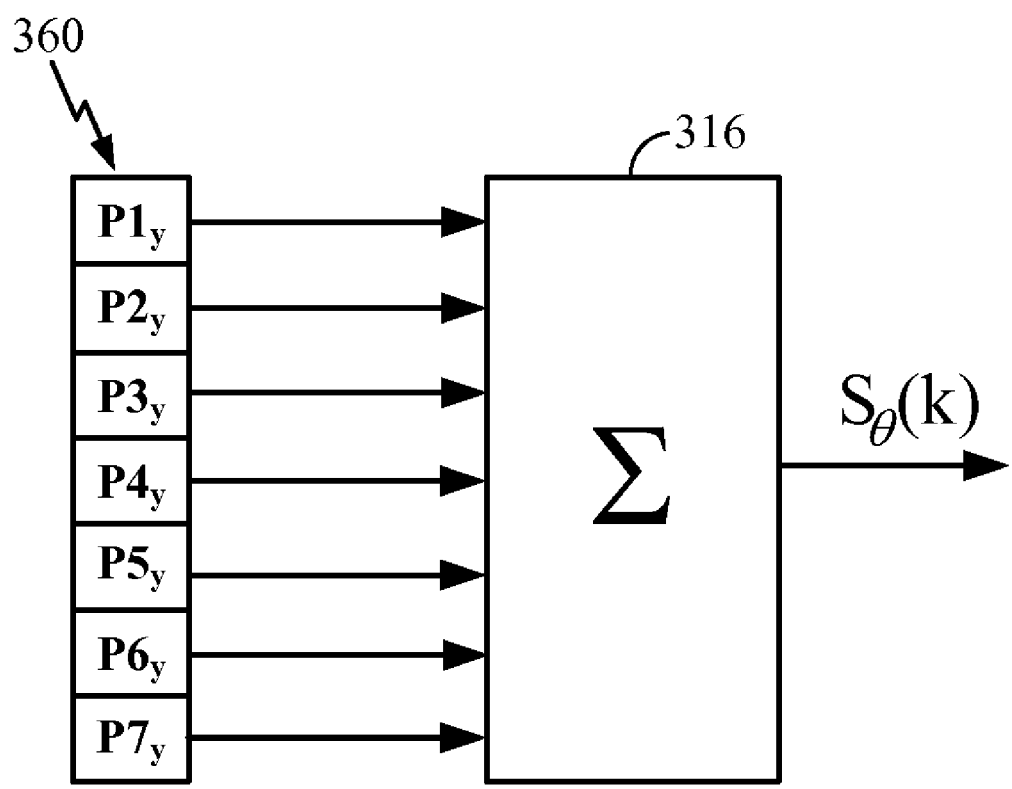

FIG. 10 illustrates a radial integrator summing a set projections of any sector amongst the K sectors in a circle.

Figure 11:
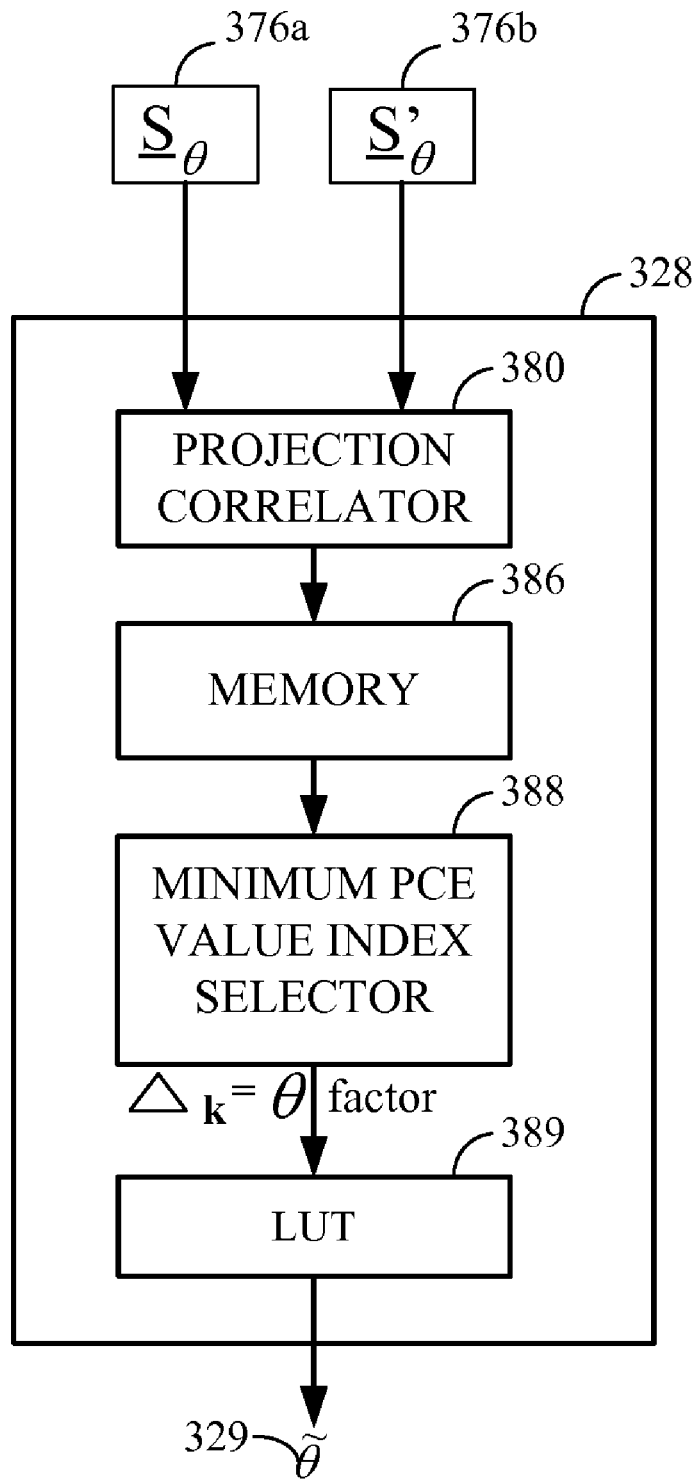

Illustrated in FIG. 11 is a possible configuration of a rotational motion vector estimator.

Figure 12:
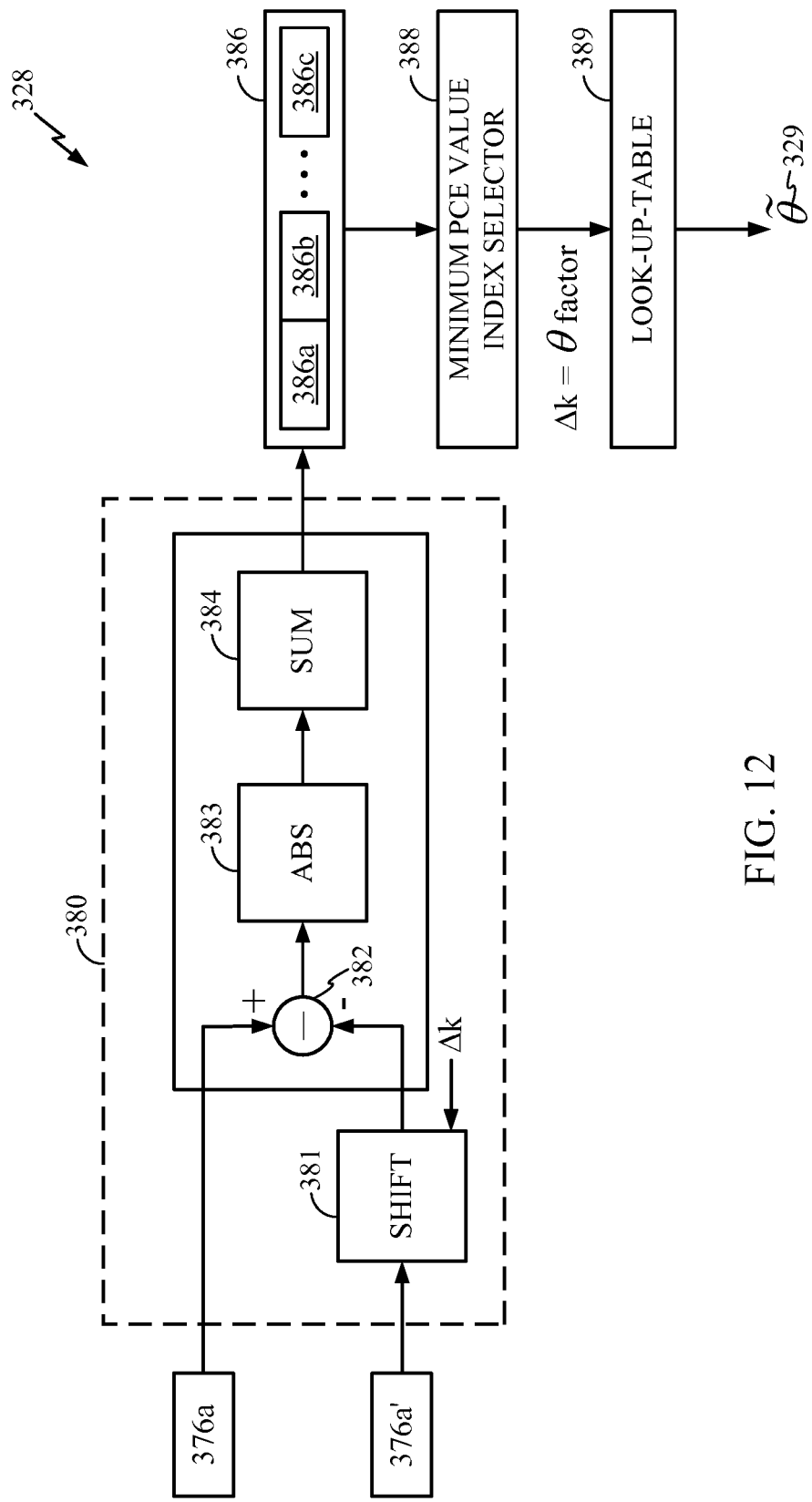

FIG. 12 illustrates more details of the rotational motion vector estimator shown in FIG. 11.

Figure 13:
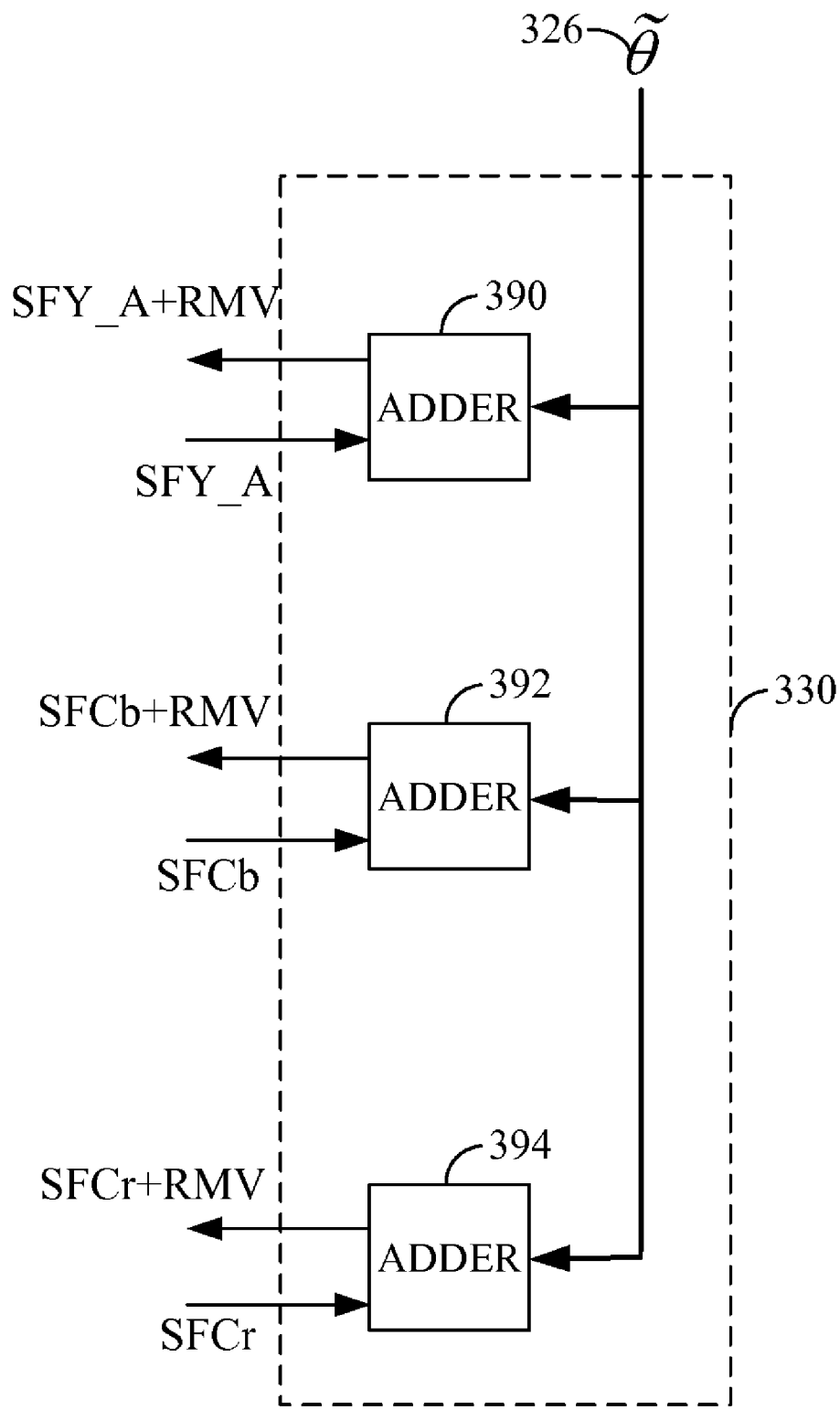

One architectural configuration of a frame registrator is shown in FIG. 13.

Figure 14:
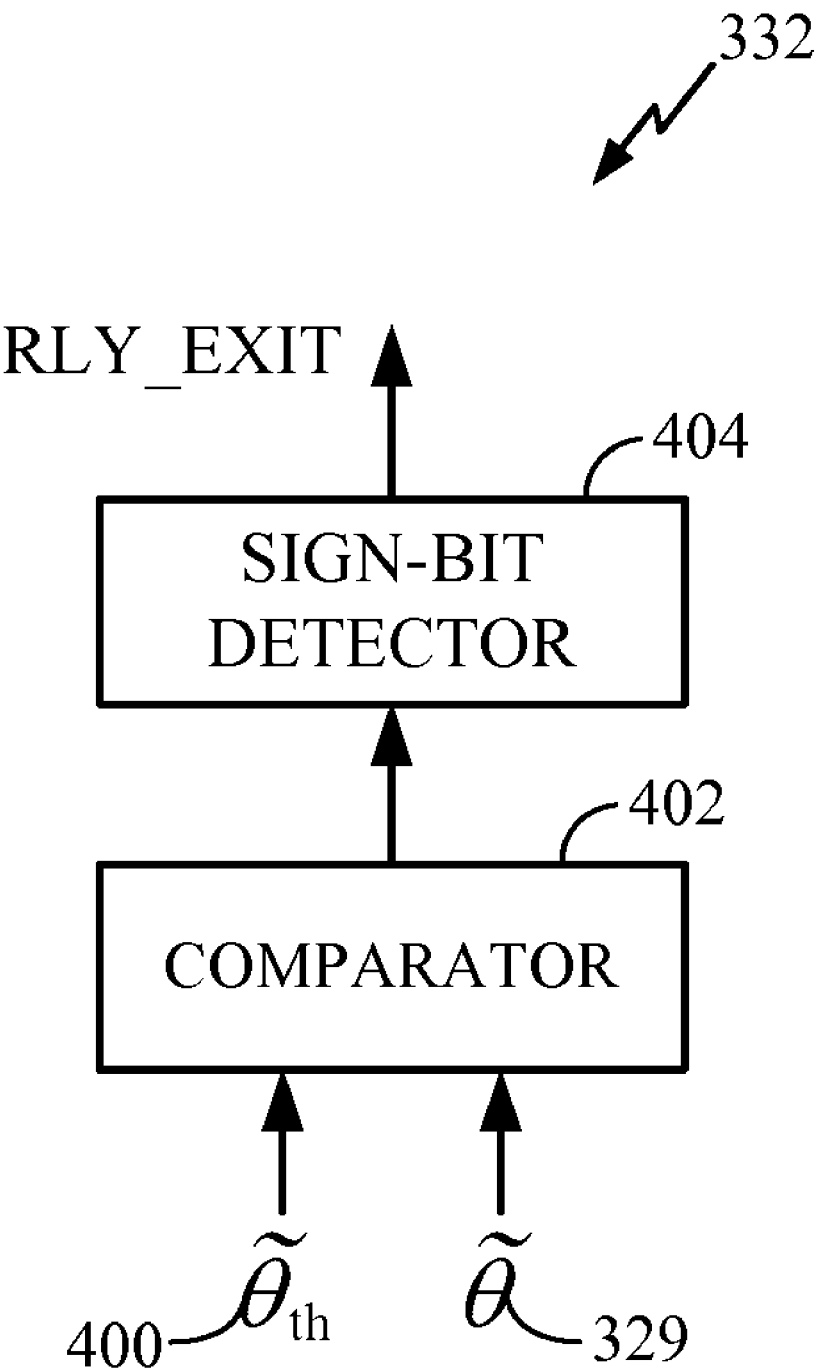

FIG. 14 illustrates a possible configuration of an early terminator.

Figure 15:
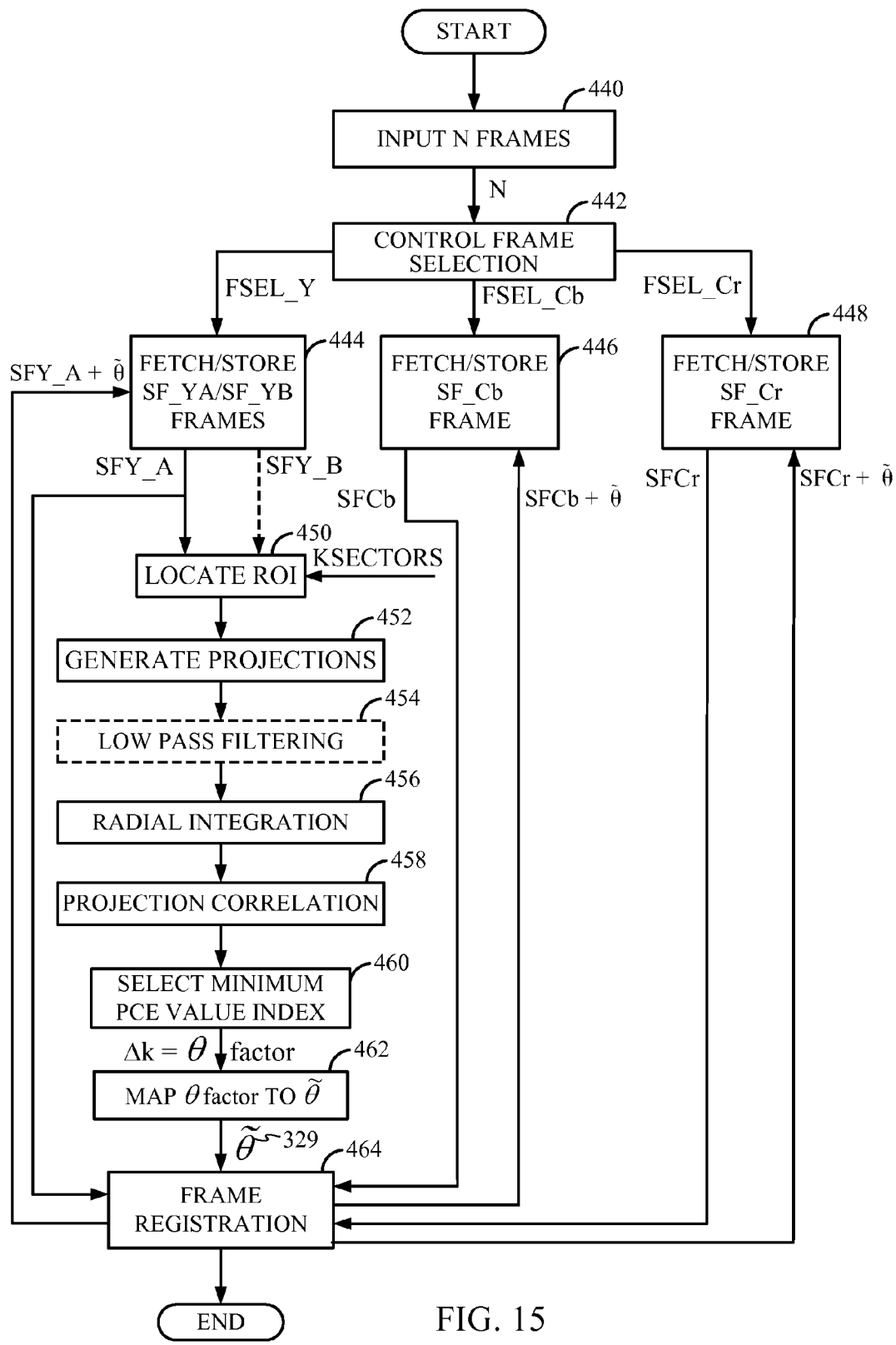

FIG. 15 is a flow chart illustrating a possible method of frame registration of images.

Figure 16A:
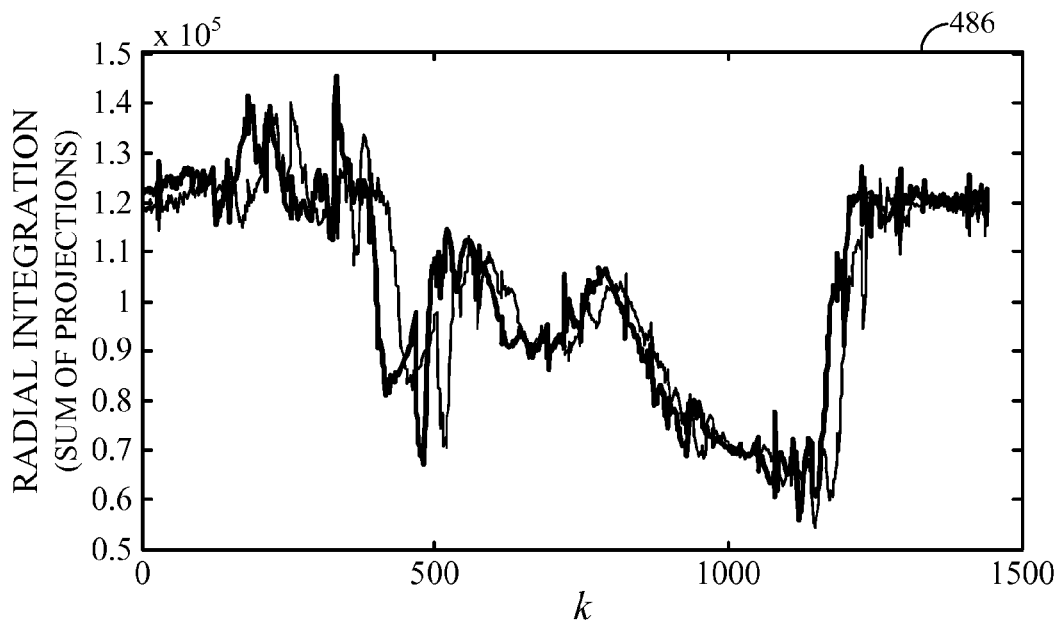

A graph of the radial integrated outputs is illustrated in FIG. 16A.

Figure 16B:
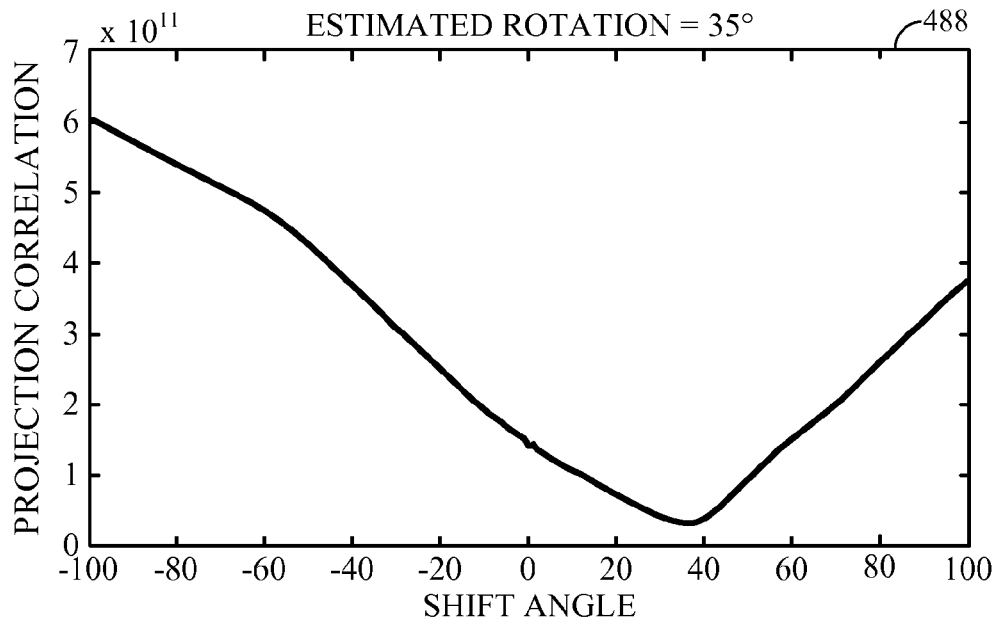

A graph of the projection correlation between two input vectors is shown in FIG. 16B.

Figure 17A:
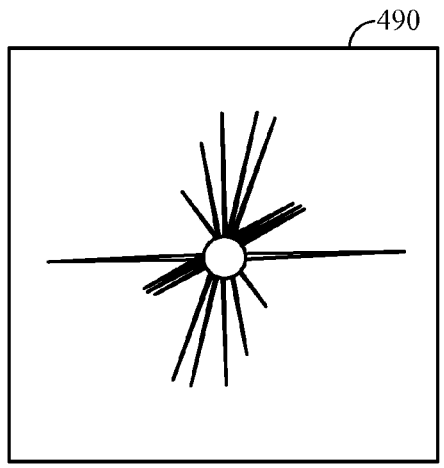

The fourier transform of a base frame is shown in in FIG. 17A.

Figure 17B:
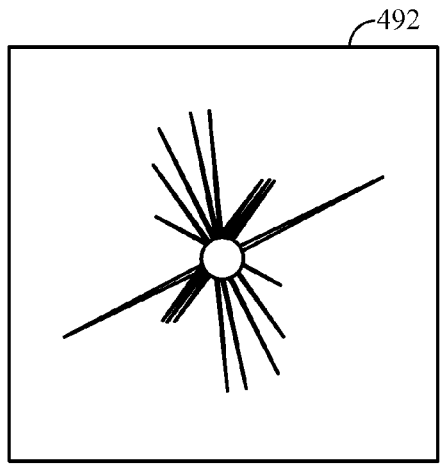

The fourier transform of a movement frame is shown in FIG. 17B.

Figure 17C:
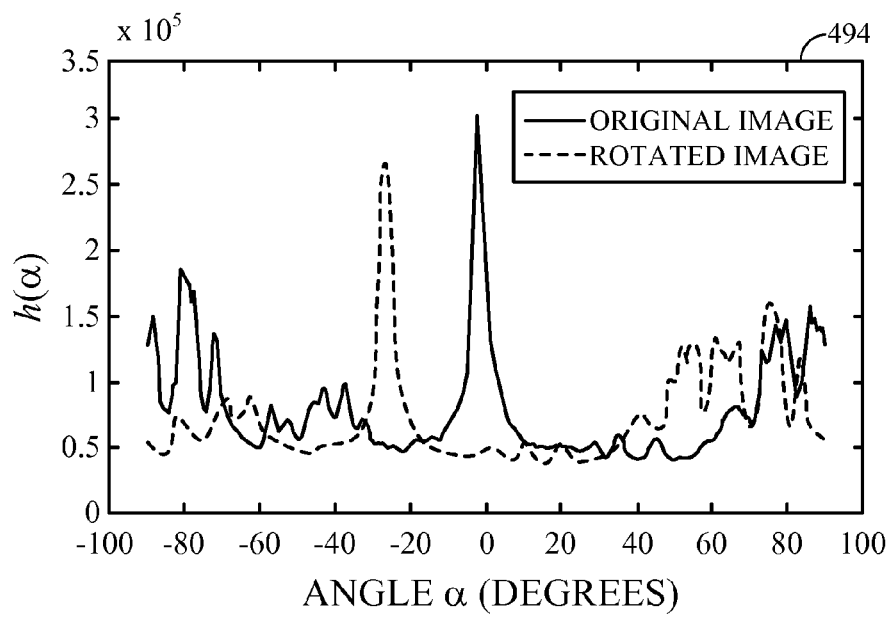

FIG. 17C, displays a graph of the radial integration of both frames, and illustrates what the relative rotation angle estimate difference between the two frames is.

DETAILED DESCRIPTION

The word "exemplary" is used herein to mean "serving as an example, instance, or illustration." Any embodiment, configuration or design described herein as "exemplary" is not necessarily to be construed as preferred or advantageous over other embodiments or designs. In general, described herein, is a novel method and apparatus to reduce blurriness and/or noise in digital pictures by generating a rotation angle estimate and using the estimate for frame registration.

In conventional camera devices, when a user takes a snapshot (currently done by pressing a button), mostly only one frame is used to generate a picture. Methods which employ using more than one frame to generate a picture often are not successful because they yield poor results. With conventional camera devices, the picture may be blurry due to movements produced by the user's own hand movements, these hand movements are known as hand jitter. Conventional camera devices also are challenged by the amount of time required to expose a picture. Under low lighting conditions, the exposure time is typically increased. Increasing the exposure time increases the amount of noise that a user may see due to low lighting conditions as well as increases the probability that hand jitter will produce a blurry picture. Currently, camera devices may contain small gyroscopes to compensate for the hand jitter produced by the user. However, there are many challenges faced when placing gyroscopes on mobile units. Even when these challenges are overcome, the digital hand jitter reduction techniques may be used in combination with devices that have gyroscopes. Current camera devices may also scale the gain under low lighting conditions. Unfortunately, simply increasing the gain amplifies the noise present as a result of the low light level. The result is often a picture of poor quality. Similarly, digital compensation for hand jitter does not always provide adequate results. However, with the techniques disclosed throughout this disclosure, it has been possible to reduce hand jitter, as well as reduce noise under lower light conditions.

Figure 1:
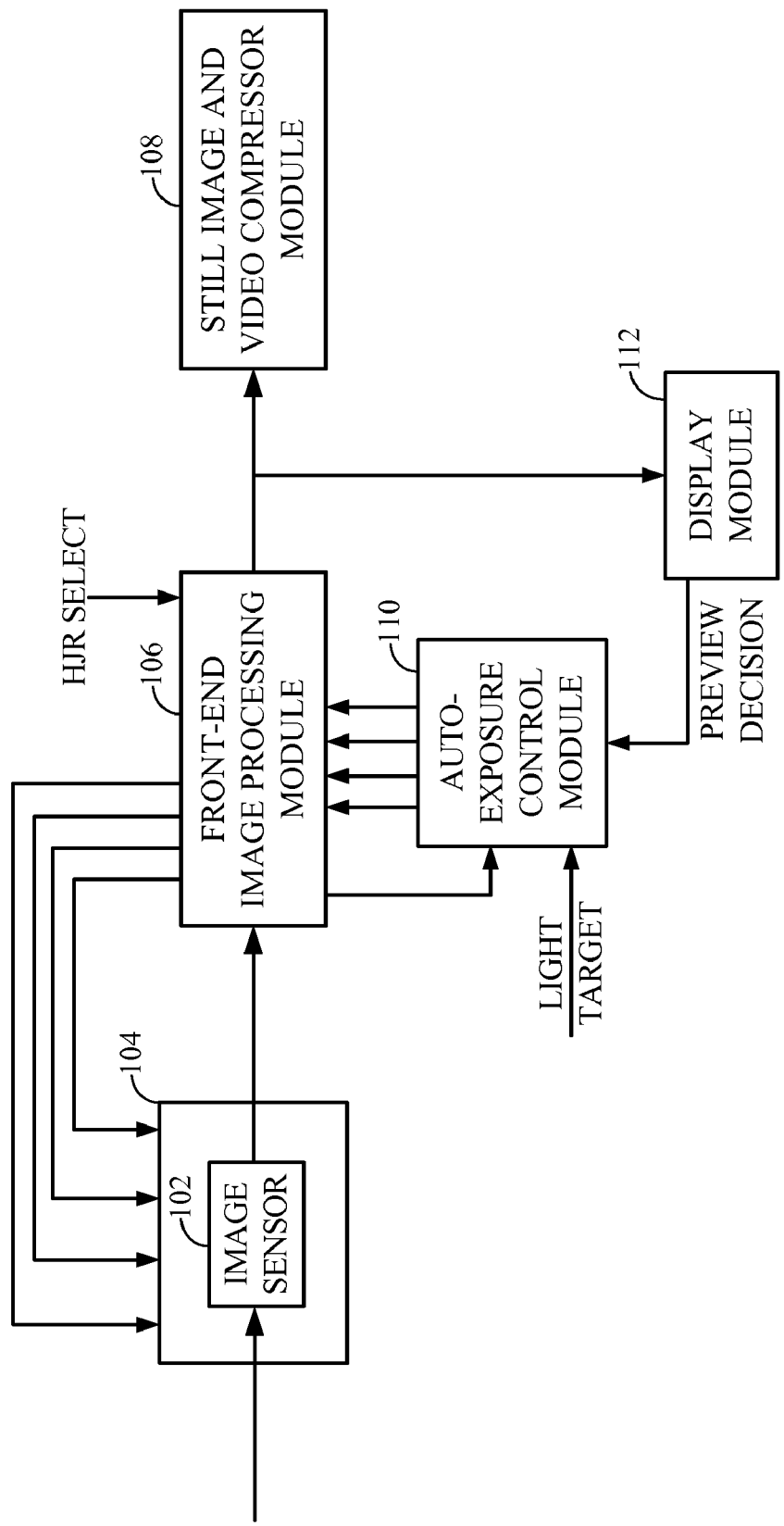
FIG. 1 is a block diagram illustrating a digital imaging process.

FIG. 1 is a block diagram illustrating a digital imaging process suitable for a camera device integrated into a mobile unit. The mobile unit may be a wireless phone, personal digital assistant (PDA), laptop computer, or any other mobile wireless device. A lens (not shown) may be used to focus an image onto an image sensor 102, in an image sensor module 104. In one configuration, image sensor module 104 may have a memory for storing gain and exposure parameters. Image sensor module 104 may also have a control driver for modifying gain and auto-exposure parameters. In another configuration, image sensor module 104 may be coupled to an integrated circuit, such as a Mobile Station Modem (MSM™), or other module which has a memory and/or control driver for storing and modifying gain and auto-exposure parameters. The image sensor 102 may be a charge-coupled device (CCD), a complimentary metal oxide semiconductor (CMOS) image sensor, or any other suitable image sensor. In at least one configuration of the image sensor 102, an array of semiconductors may be used to capture light at different pixels of the image. A color filter array (CFA) (not shown) positioned in front of the image sensor 102 may be used to pass a single color (i.e., red, green or blue) to each semiconductor. The most common CFAs are RGB and CMYG patterns. The image sensor module 104 may drive or control image sensor 102 to modify the gain, and or exposure time.

Before a user presses the button to take a snapshot and produce a digital picture, a preview mode, may capture a series of frames produced by the image sensor 102. The whole frame or a sub-part of the frame is referred to as an image or interchangeably a picture. For illustrative purposes, it is convenient to discuss the images being processed as a series of frames. Although it should be recognized that not the entire frame need be processed when using a front-end image processing module 106. In addition, the sequence of frames is also known as a stream. The stream may be provided to a front-end image processing module 106 where they are demosaiced in order to obtain full RGB resolution as an input to the still image and video compressor 108. As the stream passes through the front-end image processing module 106, in the preview mode, statistics may be collected on frames that aid with the production of the digital picture. These statistics may be, but are not limited to, exposure metrics, white balance metrics, and focus metrics.

The front-end image processing module 106 may feed various signals, which help control the image sensor 102, back into the image sensor module 104. The still image and video compressor 108 may use JPEG compression, or any other suitable compression algorithm. An auto-exposure control module 110 may receive a value proportional to the light level being processed by the front-end image processing module 106, and compare it to a stored light target, in order to aid in at least one of the functions of the front-end image processing module 106. Images that are processed through the modules in front-end image processing module 106 are part of digital frames. The stream may also be sent to a view finder which may be located in display module 112. In the preview mode, a preview decision from the display module 112 may be used in the control of the auto-exposure.

The preview mode in a mobile unit having a digital camera may be used in either a normal mode or a hand jitter reduction (hjr) mode. The user may select the hjr mode (shown as hjr select in FIG. 1) through a user-interface either through a menu or manually. Auto-exposure parameters such as gain, auto-exposure time, frame rate and number of frames to process, may be determined within moments after the user presses the button to take a snapshot and produce a digital picture. The collected statistics may be used to determine auto-exposure parameters used during the snapshot in both the normal mode and the hjr mode. Hence, after the user presses the button, the image processing may be different between hjr mode and normal mode. Before the user presses the button the preview mode is processing images as it would in normal mode, even if the hjr mode has been selected.

Figure 2:
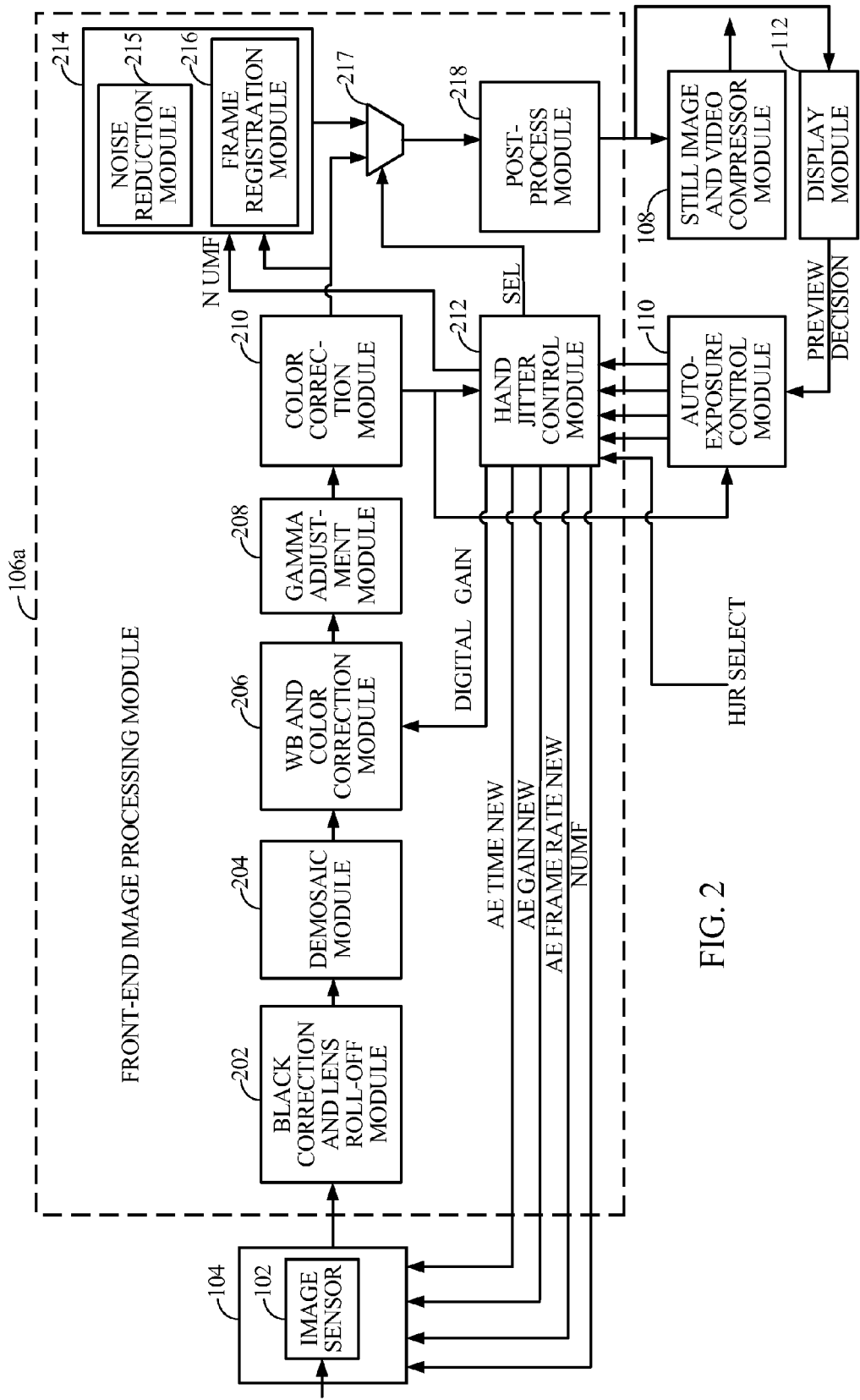
FIG. 2 is a block diagram illustrating the functionality of a pre-processing module in a digital image processing system.

FIG. 2 is a block diagram illustrating the functionality of one configuration of one front end image processing module 106a in a digital image processing system. The front-end image processing module 106a may be used to compensate for differences between the responses of human visual system and sensor signals generated by the image sensor 102. These differences may be corrected using various processing techniques including, by way of example, black correction and lens rolloff 202, de-mosaic module 204, white balance and color correction 206, gamma adjustment 208, and color conversion 210. These processes are represented in FIG. 2 as separate processing modules, but alternatively may be performed using a shared hardware or software platform. Moreover, these modules may include multiple image processing modules that perform the same function, thereby allowing the function to be performed in parallel on different images.

After the color conversion module processes a frame, three color image-components (Y, Cb, and Cr) may be may be sent to hand jitter control module 212. The various parameters from the auto-exposure control module may be fed into hand jitter control module 212. Hand jitter control module 212 may serve multiple purposes. Hand jitter control module 212, may determine the image processing that takes place after the snapshot. Hand jitter control module 212 may detect the value of hjr select, and determine if hand jitter reduction (hjr) needs to be performed. Even though the user has selected hjr mode, hand jitter control module 212 may determine that image processing as is done in normal mode may take place. Hand jitter control module 212 may determine that image processing in hjr mode take place. Generating a digital picture image processing in hjr mode may include capturing a single frame or multiple frames. If hand jitter control module 212 determines that multiple frames will be captured, after passing through hjr control module, the frames may be sent to noise reduction/frame registration module 214, along with a parameter which indicates how many frames may be processed by noise reduction/frame registration module 214. If a single frame is to be processed, noise reduction may take place on the single frame through the use of a noise reduction module 215. Noise reduction module may be a bayer filter, or other similar filter. If multiple frames are to be processed, noise reduction/frame registration module 214 may buffer the number of frames, numf, specified by hand jitter control module 212, and perform frame registration on them. Depending on how many frames and the light level, the purpose of the multiple frame registration may serve the purpose of noise reduction and/or blur reduction. Multiple frame registration may be done by a frame registration module 216.

If hand jitter control module 212 determines that image processing takes place as in normal mode, noise reduction/frame registration module 214 may not be used, and the output from color correction module 210, for example, may be used, even though the user selected hjr mode. Depending on what image processing (the one in normal node or the one in hjr mode) is determined by hand jitter control module 212, a signal (sel) may be used to select which multiplexer 217 output to send to post-process module 218. The output of post-process module 218 may be sent to still and image video compressor 108 and/or display module 112.

In addition to outputting a select signal (sel) and the number of frames to use for noise reduction and/or frame registration, hand jitter control module 212 may also output other parameters: new auto-exposure frame rate (ae fr_new), new auto-exposure gain (ae gain_new), new auto-exposure time (ae time_new), and the number of frames to be processed (numf). These parameters may be sent to image sensor module 104 to control image sensor 102. A digital gain may also be output by hand jitter control module 212 and may be applied at any module after the image sensor module 104. As an example, the digital gain may be applied during the white-balance/color correction module 206.

Those ordinarily skilled in the art will recognize that while pixels are normally described, sub-pixels, or multiple pixels may also be used as inputs into front-end image processing module 106a. Furthermore, a sub-set of these image-components or other forms: RGB, and spatial-frequency transformed pixels, may also be sent to a hand jitter control module, such as hand jitter control module 212.

As mentioned previously, the frame registration module 216 may used to reduce the amount of blurriness or reduce noise in a digital picture with efficient processing resources suitable for mobile applications. Currently, a normal exposure time for a picture may be around 150-300 milli-seconds (ms). Instead of capturing one picture (frame) in 150-300 ms, N frames may be captured and processed at reduced exposure times prior to frame registration. In order to reduce the amount of blurriness in a picture, frame registration module 216 may compensate for the amount of rotational movement between any two frames amongst the N frames being processed at the reduced exposure times.

Typically in a frame registration module 216, N frames are processed by iteratively selecting a pair of frames at a time: a base frame and a movement frame. Compensation of rotational movement, between the base frame and the movement frame, is accomplished by estimating rotation angle during every iterative frame pair selection and "registering" the movement frame to the base frame. After computing an estimate of the rotational movement between the horizontal and vertical movement frame relative to the base frame, the movement frame is registered to the base frame by adding the estimated rotation angle estimate to the base frame. The registered frame represents the compensation of the base frame due to the estimated rotation angle between the base frame and the movement frame. The registered frame may be used as a new base frame or may be used as a new movement frame. The selection of how any frame, registered or not registered, depends on the parity of the number of frames being processed and may be configurable. The frame selection process is discussed in more detail in FIGS. 5A-5F.

Figure 3:
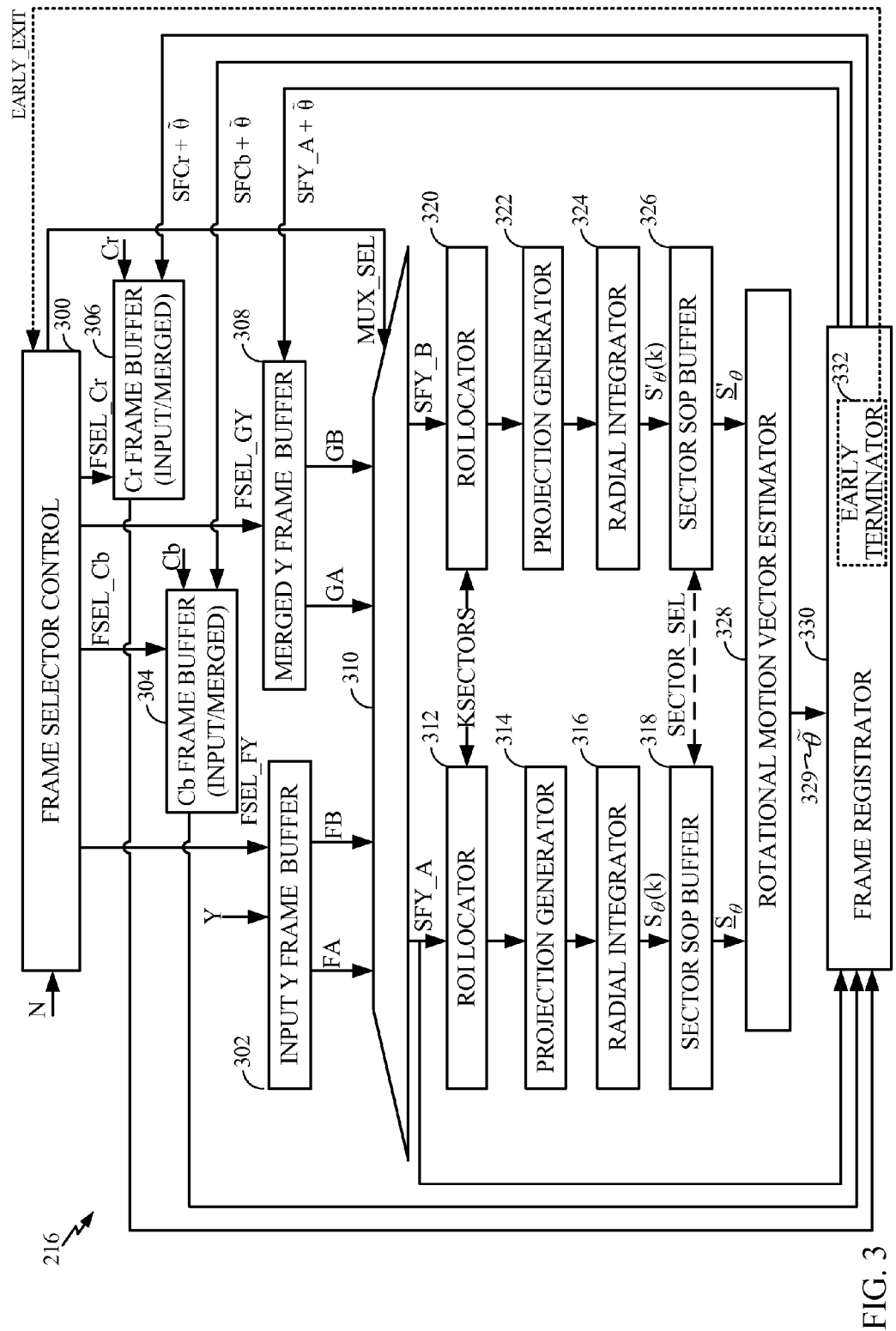
FIG. 3 is a hardware block diagram of one architectural configuration illustrating a frame registration module for estimating rotational motion.

The frame selection process may be implemented by a frame selector control 300, seen in FIG. 3. FIG. 3 is a hardware block diagram of one architectural configuration illustrating a frame registration module 216a for estimating rotational motion. As mentioned above, the number of frames being processed by frame registration module 216 may be predetermined prior to frame registration. Frame selector control 300 may use a configurable look-up table (see discussion for FIGS. 5A-5F) to select amongst frames fa, fb, ga, or gb. The two unregistered frames being processed are designated as fa and fb. The two registered frames being processed are designated as ga and gb.

After the color conversion process three color image-components (Y, Cb, and Cr) may be input into a frame registration module 216a. However, artisans ordinarily skilled in the art will recognize that a sub-set of these image-components or other forms: R, G, and B; and spatial-frequency transformed pixels; of these image-components, may also be used. Furthermore, while pixels are normally used, sub-pixels, or multiple pixels may also be used as inputs. Image-component Y may be routed to input Y frame buffer 302, image-component Cb may be routed to input/merged Cb frame buffer 304, and image-component Cr may be routed to input/merged Cr frame buffer 306. Frame registration may be carried out on all three image-components (Y, Cb, and Cr). Estimation on a rotation angle need only be performed on one of the image-components, although it may be performed on more than one component. Illustrated as an example, the Y image-component may be used to estimate the rotation angle. As such, a registered frame may be routed to merged Y frame buffer 308. In addition, the frame registration process may be carried out on only part of a frame if desired.

Frame selector 300 may have up to five outputs, mux_sel, fsel_Cb, fsel_Cr, fsel_fy, and fsel_gY. From frames fa, fb, ga, or gb, mux_sel selects from mux 310 which two pair of frames may be used to estimate the rotation angle between a base frame and a movement frame. A base frame is designated by frame sfY_a, and a movement frame is designated by a movement frame sfY_b. Selection of frame fa and frame fb may be through signal fsel_fy, while selection of frame ga and frame gb may be through signal fsel_gY. Similarly, fsel_Cb and fsel_Cr may be used to select which Cb (sfCb) and Cr (sfCr) frames may be used for frame registration of the Cb and Cr image-components.

Frame sfY_a may be routed to a region of interest (ROI) locator 312. An ROI in the art usually identifies areas in a frame that may be considered to be visually important, examples include objects, a part of an object, or a face. The ROI locator 312 described herein may work in conjunction with known or future ROI's algorithms that identify visually important areas. Once a region of interest is identified, the ROI locator 312 may form a set of K sectors that forms a circle. The formation of the K sectors may aid in the estimate of the rotation angle. As can be seen in FIG. 3, K sectors are input to ROI locator 312. The number of K sectors may be configurable and is determined by what resolution is desired for the rotation angle estimate. After ROI locator 312 segments the region of interest into K sectors, forming a circle, projection generator 314 may generate a horizontal (or vertical) projection for any $L^{th}$ row (or column) of a sector. Interpolation or decimation of rows in a sector may also be implemented, i.e., the number of horizontal projections generated in a sector may be more or less than L. Radial integrator 316 sums a set or a subset of the horizontal (or vertical) projections (1 up to L) for any of the K sectors. Each $k^{th}$ sum of projections is represented by $S_\theta(k)$. Sum of projections (SOP) buffer 318 may store any $S_\theta(k)$ selected. Selection is accomplished through optional control signal sector_sel. In some cases, a subset of the K sectors may be stored for a more coarse calculation of the rotation angle estimate. The set or subset (if a coarser calculation is used) of a sum of projections, i.e., $\{S_\theta(0), S_\theta(1), \ldots S_\theta(K-1)\}$, may be represented by a vector, and is denoted as $S_\theta$.

Similarly, frame sfY_b may be routed to a region of interest (ROI) locator 320 which has a configurable input to form K sectors. ROI locator 320 also segments the region of interest into a circle of K sectors, and projection generator 322 may generate a horizontal (or vertical) projection for each $L^{th}$ row (or column) of a sector. Interpolation of projections in a sector may also be implemented, i.e., the number of projections generated in a sector may be more than L. Decimation of projections in a sector may be implemented, i.e., the number of projections generated in a sector may be less than L. Radial integrator 324 sums a set or a subset of the horizontal (or vertical) projections (1 up to L) for any of the K sectors. Each $k^{th}$ sum of projections is represented by $S'_\theta(k)$. Sum of projections (SOP) buffer 326 may store any $S'_\theta(k)$ selected. Selection is accomplished through optional control signal selector_sel. In some cases, a subset of the K sectors may be stored for a more coarse calculation of the rotation angle estimate. The set or subset (if a coarser calculation is used) of a sum of projections, i.e., $\{S'_\theta(0), S'_\theta(1), \ldots S'_\theta(K-1)\}$, may be represented by a vector, and is denoted as $S'_\theta$.

Rotational motion vector estimator 328 receives two sets of data, namely input vectors $S_\theta$ and $S'_\theta$, and generates rotation angle estimate $\bar{\tilde{\theta}}$ 329. Rotation angle estimate $\tilde{\theta}$ 329 may be added to sfY_a, sfCb, and sfCr in frame registrator 330. The resulting registered frames, namely, $sfY\_a+\tilde{\theta}$, $sfCb+\tilde{\theta}$, and $sfCr+\tilde{\theta}$, may be stored in buffer memories merged_Y frame buffer, input/merged Cb frame buffer, and input/merged Cr frame buffer, respectively. After the first iteration of frame registration(s), frame ga may be available for the second iteration of frame registration(s). Early terminator 332 may determine if the rotation angle estimate is within a certain tolerance and cause an early exit condition and terminate the frame registration earlier than the processing of N frames.

Figure 4:
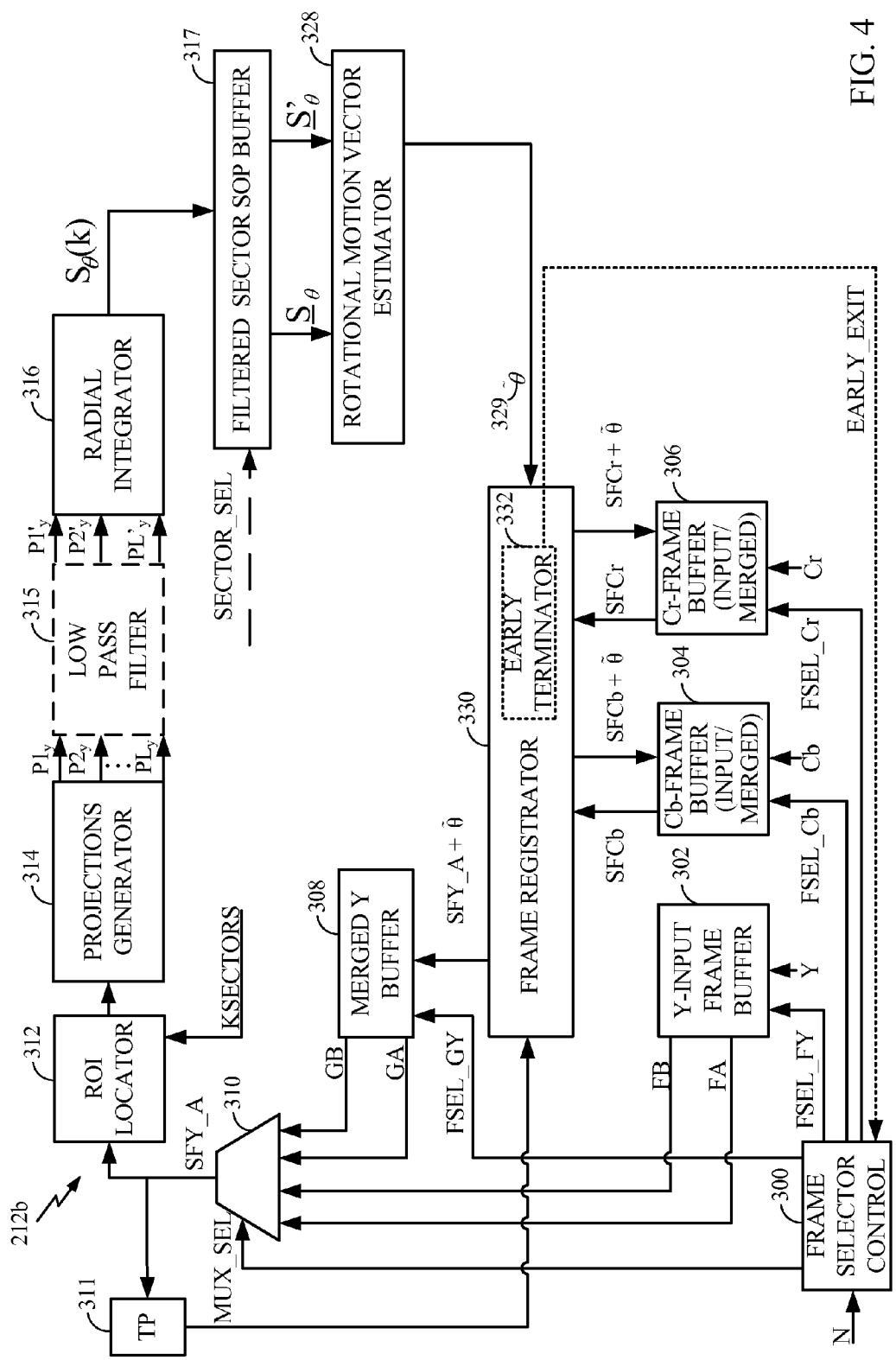
FIG. 4 is a hardware block diagram of another architectural configuration illustrating a frame registration module for estimating rotational motion.

FIG. 4 is a hardware block diagram of another architectural configuration illustrating a frame registration module 216b for estimating rotational motion. The architectural configuration illustrated in FIG. 4 aims to reduce the number of components used to generate any sum of projections, $S_\theta(k)$. As such, there is only one ROI locator 312, one projections generator 314, and one radial integrator 316, instead of two of each of these components, as shown in FIG. 3. In addition, projections Ply through PLY that may be generated by projections generator 314 may be filtered through an optional low pass filter 315. Filtered projections P1'y through PL'y may be passed into radial integrator 316 to generate a sum of each set of projections (1 up to L) for any sector.

Although frames may be processed simultaneously, through interleaving of rows between a base frame and a movement frame, the output of radial integrator 316 in FIG. 4 illustrates the processing of any one of K sectors from one frame (either a base frame or a movement frame) to generate a sum of projections for a sector, $S_\theta(k)$. In the architectural configuration illustrated in FIG. 4, an sfY_a frame is either a base frame or a movement frame, that is, sfY_a is of the following form: [base frame, movement frame, base frame, movement frame, . . . base frame, movement frame]. When sfY_a is a base frame, toggle pass (TP) 311, in the upper left corner of FIG. 3, allows sfY_a to pass into frame registrator 330.

Filtered sector sum of projections (SOP) buffer 317 may store any sum from each set of projections for any sector amongst the set of sectors from a base frame and may store each sum from each set of projections for any sector amongst the set of sectors from a movement frame. Although the set of sectors from a base frame or a movement frame is typically K sectors, less than K sectors may be selected through optional control signal sector_sel.

Interpolation of projections in a sector may also be implemented, i.e., the number of projections generated in a sector may be more than L. Decimation of projections in a sector may be implemented, i.e., the number of projections generated in a sector may be less than L. Radial integrator 316 may sum a set or a subset of the horizontal (or vertical) projections (either filtered or unfiltered) for any of the K sectors. Each $k^{th}$ sum of projections is represented by $S_\theta(k)$. Sum of projections (SOP) buffer 317 may store any $S_\theta(k)$. In some cases, a subset of the K sectors may be summed for a more coarse calculation of the rotational angle estimate. The set or subset (if a coarser calculation is used) of a sum of projections, i.e., $\{S_\theta(0), S_\theta(1), \ldots S_\theta(K-1)\}$, may be represented by a vector, and is denoted as vector $S_\theta$ for a base frame, and as a different vector $S'_\theta$ for a movement frame.

The inputs ($S_\theta$ and $S'_\theta$) and the output (rotation angle estimate $\bar{\tilde{\theta}}$ 329) to motion vector estimator 328, as well as the components and calculations that follow the estimate of rotation angle $\bar{\tilde{\theta}}$ 329, are as disclosed in FIG. 3. In both FIG. 3 and FIG. 4, what is disclosed illustrates that for any base frame and movement frame pair, on at least one image-component (e.g. Y), an iteration of frame registration takes place. For every iteration, a rotation angle estimate angle $\hat{\theta}\theta$ 329 may be generated.

Selection of which frame is a base frame and which frame is a movement frame may be designated by frame flow-trees such as those illustrated in FIG. 5A-5F, and which may be implemented in a block such as frame selector control 300. Frame flow-trees may be implemented by using a configurable look-up-table (LUT) designating what frames to register in each row of a frame flow-tree, depending on the parity of the number of frames in the row. The frame flow-tree 332*a* illustrated in FIG. 5A has four rows. Row 1 shows six initial unregistered frames: f1 (base), f2 (movement), f3 (base), f4 (movement), f5 (base) and f6 (movement). Each of the six unregistered frames may represent an image-component, for example, the Y image-component. Frame registration of frame f2 to f1 generates registered frame g1*a* in row 2, frame registration of frame f4 to f3 generates registered frame g2*a* in row 2, and frame registration of frame f6 to f5 generates registered frame g3*a* in row 2. When there is an even number of frames in a row, the number of frame registrations yielding the subsequent row may be the even number divided by two. When there are three number of frames in a row, the mid-frame in the row, may be a base frame or a movement frame. For example, to generate frame g1*b* in row 3, g2*a* is used as a movement frame, and to generate frame g2*b* in row 3, g2*a* is used as a base frame. Row 4 contains registered frame g1*c* generated by registering frame g3*a* to registered frame g1*b*. As can be seen, frame registration may be on a previously registered frame or an unregistered frame.

Figure 5A:
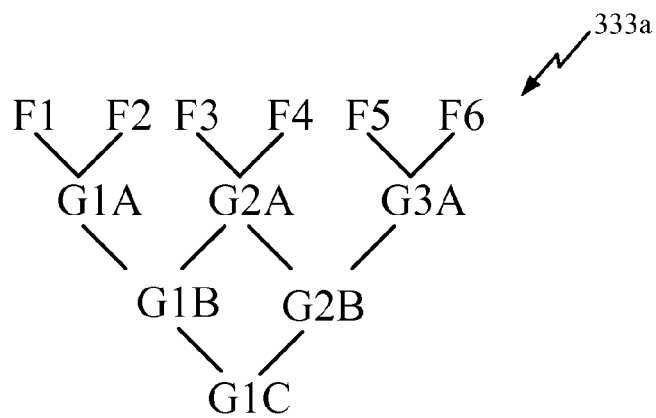
FIG. 5A-5F illustrate frame flow-trees, which may be used in the selection of which frame is a base frame and which frame is a movement frame.
Figure 5B:
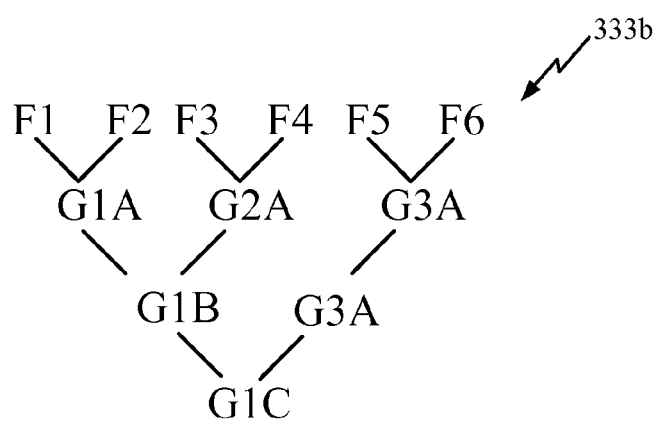
Figure 5C:
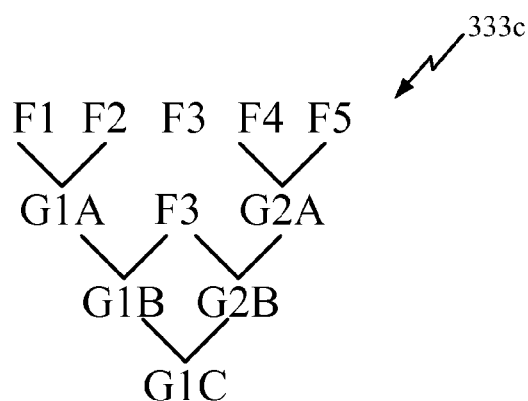

Frame flow-tree 332*b* illustrated in FIG. 5B also shows six initial unregistered frames in row 1. However, registered frame g2*a* is used only as a movement frame. The process of using the mid-frame (g2*a*), in a three frame row, as only a movement frame eliminates one frame registration iteration, although, it may not necessarily yield as accurate results. Frame flow-tree 332*c* illustrated in FIG. 5C shows an initial five unregistered frames in row 1. When the number of frames are odd and greater than three, the mid-frame may initially not be used in the frame registration to save on the number of frame registration iterations. That is, frame pairs f1 and f2, as well as frame pairs f4 and f5, are used to generate registered frames g1*a* and g2*a*. Frame registration from row 2 through row 4 is as described in frame flow-tree 332*a*.

Figure 5D:
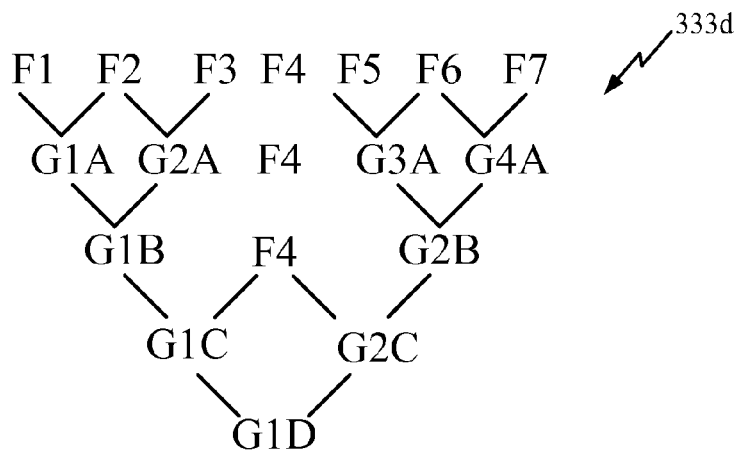

Frame flow-tree 332*d* illustrated in FIG. 5D shows seven initial unregistered frames in row 1. Since the number of frames are odd and greater than three, the mid-frame may initially not be used in the frame registration to save on the number of frame registration iterations. In addition, because there are a set of a triplet of frames on each side of the mid-frame (f4) in row 1, the triplets may be processed as discussed rows 2-4 of frame flow-tree 332*a*. This yields, in row 2 of frame flow-tree 332*d*, a frame flow-tree like frame flow-tree 332*c*, and may be processed accordingly.

Figure 5E:
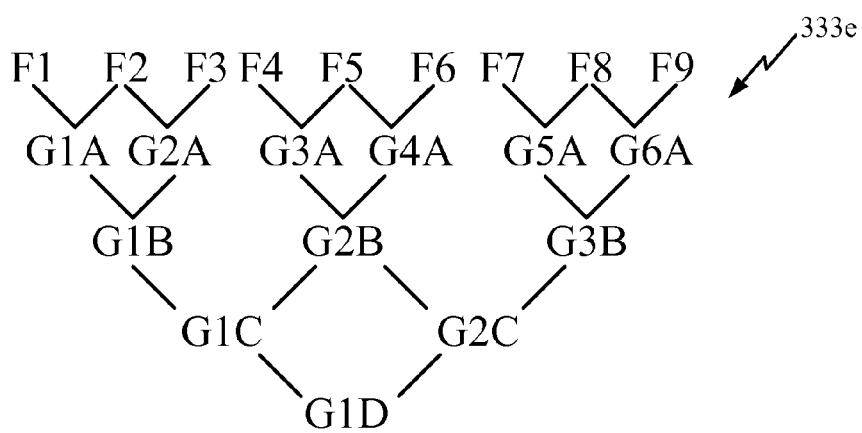
Figure 5F:
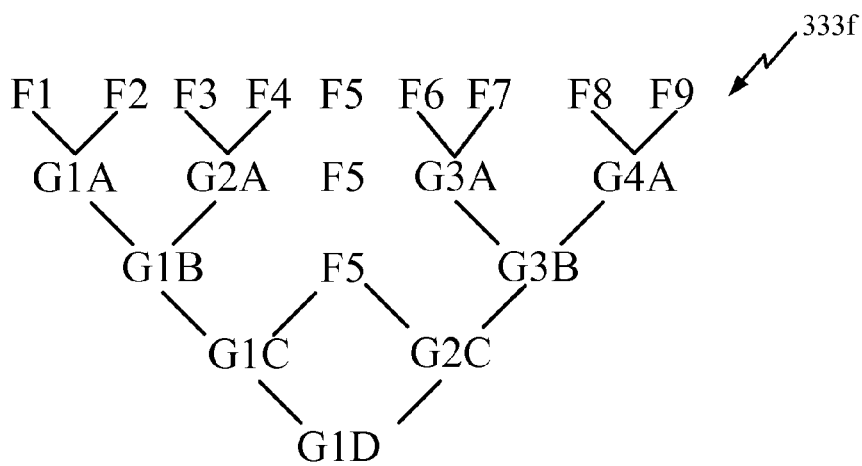

Frame flow-trees 332*e* and 332*f* illustrated in FIG. 5E and FIG. 5F, respectively, show nine initial unregistered frames in row 1. There are three sets of triplets of frames in row 1 of frame flow-tree 332*e*. The triplets may be processed as discussed for rows 2-4 of frame flow-tree 332*a*. Since the number of frames are odd and greater than three, the mid-frame (f5) in row 1 of frame flow-tree 332*f*, may initially not be used in the frame registration. Although using the process illustrated in frame-flow tree 332*f* saves on the number of frame registration iterations, it may not necessarily yield any less desirable than the process illustrated in frame flow-tree 332*e*.

As the number of frames increases the exposure times between frames decreases and the probability that there is a smaller rotational angular displacement increases. That is, the estimated rotation angle between frames when the exposure time is smaller is likely to be smaller, thus, accuracy in the estimate used for compensating for the rotation angle better. Hence, the process illustrated in frame flow-tree 332*f* may be implemented in a device that takes digital pictures using hand jitter reduction, since the process is likely to be sufficient most of the time to the human eye. Other applications that may require higher resolutions, and are not as concerned with computation time, may wish to implement a process, where there are a higher number of total frame registrations, such as in frame flow-tree 332*e*.

A region of interest (ROI) in a base frame 334*a*, and a region of interest (ROI) in a movement frame 334*b* are illustrated in FIG. 6A and FIG. 6B, respectively. An ROI locator, such as ROI locator 312 forms a circular region as shown in both figures. ROI in base frame 334*a* has one axis at zero degrees and the other axis at ninety degrees. ROI in movement frame 334*b* shows the two axes rotated by angle θ (theta) 336. By frame registration of a movement frame 334*b* to a base frame 334*a*, an estimate of the rotation angle between the two frames is made, i.e., the estimation of angle theta 336.

Frame 334, such as frame sfY_a of FIG. 4, may have M columns and I rows, as illustrated in FIG. 7A. K sectors, such as a sector 338, may be formed around a circle 337, as defined by an ROI locator 312. Any sector 338, that is part of circle 337, may have multiple rows and columns. In FIG. 7B, rows 1 through 8 are illustrated by figure numbers 340-347. Row 1 is labeled as figure number 340. Row 2 is labeled as figure number 341. Row 3 is labeled as figure number 342. Row 4 is labeled as figure number 343. Row 5 is labeled as figure number 344. Row 6 is labeled as figure number 345. Row 7 is labeled as figure number 346. Row 8 is labeled as figure number 347.

Projections may be on columns or rows. For illustrative purposes, discussion is limited to horizontal projections on rows, although vertical projections on columns may also be used. FIG. 8 illustrates a projection generator 314 that may generate a horizontal projection of row 4 (figure number 343) in any sector 338. The pixels (also sub-pixels, multiple pixels, or transformed pixels may be used) are input into summer 350 and summed to generate a projection 352, $P3_y$, $P3_y$ represents the third horizontal projection generated in any sector 338 by projection generator 314. Although there are 8 rows illustrated in FIG. 7B, row 1 illustrated in any sector 338 does not contain any whole pixels. Generally, projections are computed on rows (or columns) which have more than one whole pixel to sum over. If the sector boundary cuts off any pixels in a row (or column) as is cutoff for row 1, the pixels are not used in the sum used to generate a projection. Hence, what is illustrated are horizontal projections generated over rows 2-8. Projection P1y is generated over row 2, projection $P2_y$ over row 3, etcetera. The set of projections $\{P1_y, P2_y, \ldots, PL_y\}$ 360, where L=7, in any sector 338 are shown in FIG. 9. FIG. 9 illustrates each projection by a horizontal line, with an arrow tip, spanning the whole pixels in each row, where the projection is generated over.

FIG. 10 illustrates a radial integrator, such as radial integrator 316, summing the set (a subset may also be used) of projections 360 of any sector 338 amongst the K sectors in circle 337. Each $k^{th}$ sum is represented by $S_\theta(k)$. Sector sum of projections (SOP) buffer 317 may store any $S_\theta(k)$ selected. The set or subset (if a coarser calculation is used) of the sum of projections, i.e., $\{S_\theta(0), S_\theta(1), \ldots S_\theta(K-1)\}$, may be represented by a vector, is denoted as vector $S_\theta$ for a base frame and as a different vector $S'_\theta$ for a movement frame. Also shown in FIG. 10, is the arc start of a sector 370 and the arc stop of a sector 371. These start and stop points are helpful in explaining later (in FIG. 12), where the location of the rotation angle estimate is measured. Illustrated in FIG. 11 is one possible configuration of a rotational motion vector estimator 328, with two inputs, vector $S_\theta$ 376a and vector $S'_\theta$ 376a', and one output rotation angle estimate $\tilde{\theta}$ 326. Projection correlator 380, computes the difference between the two input vectors ($S_\theta$ and $S'_\theta$) and generates a projection correlation error (pce) vector at each shift position between the two input vectors. Computing the difference of the input vectors for the set of shift positions between the input vectors generates a set of pce vectors. Computing the norm of each pce vector at each shift generates a pce value. Each pce value may be stored in memory 386. Minimum pce value index selector 388 selects the minimum pce value amongst the set of pce values stored in memory 386. It outputs the shift position that corresponds to the minimum pce value, i.e., the index of the minimum pce value is the shift position, and is called the θ (theta) factor. A look-up-table (LUT) 389 may be used to map the θ factor to an angle which is the rotation angle estimate $\tilde{\theta}\theta$ 329.

FIG. 12 illustrates more details of the rotational motion vector estimator 328 shown in FIG. 11. Input vectors, $S_\theta$ 376a and $S'_\theta$ 376a', are input into projection correlator 380. Either input vector may be connected to a shifter 381 which shifts by $\Delta_k$ positions. The shifter 381 is used for shift aligning the vector $S_\theta$ 376a with the different vector $S'_\theta$ 376a'. Subtractor 382 computes the difference between the two input vectors and generates a projection correlation error (pce) vector at each shift position between the two input vectors. Computing the norm of each pce vector at each shift position generates a pce value. To compute the norm, abs block 383 computes the absolute value of the pce vector, and summer 384 sums all the elements of the pce vector. Thus, each pce value is a norm of a pce vector. Illustrated in FIG. 12 is an L1 norm. However, another norm, such as an L2 norm or a variant of the L2 norm may be used. Each pce value may be stored in memory 386. Minimum pce value index selector 388 selects the minimum pce value amongst the set of pce values stored in memory 386. Memory elements 386a, 386b, and 386c represent pce values in the set of pce values that may be stored from the output of projection correlator 380. As noted above, the index of the minimum pce value selected is called the θ factor.

A look-up-table (LUT) 389 may be used to map the 0 factor to an angle which is the rotation angle estimate $\tilde{\theta}$ 329. Instead of a LUT, equations such as equation 1 or equation 2 may be used to map 0 factor to the rotation angle estimate $\tilde{\theta}$ 329. It should be noted that in both equations, the shift position $\Delta_k$ is a function of k. As disclosed above, k tracks the number of sums of projections for a sector, there may be up to K sums of projections (i.e., one for each of the K sectors).

$$\tilde{\theta} = \left(\frac{360°}{K}\right) * \Delta_k, \quad \text{(equation 1)}$$

where $\Delta_k$=k+1, and k=0 . . . K−1. Equation 1 may be used for estimating rotation angles where the location of the angle is measured from arc start 370 or arc stop 371 (see FIG. 10). Equation 2 may be used for estimating rotation angles where the location angle is measured at the midpoint between arc start 370 and arc stop 371.

$$\tilde{\theta} = \left(\frac{360°}{K}\right) * (\Delta_k + .5), \quad \text{(equation 2)}$$

where $\Delta_k$=k, and k=0 . . . K−1.

Mathematically, the set (for all values of $\Delta_k$) of pce values to estimate a rotational angular movement between frames is captured by equation 3 below:

$$pce(\Delta_k) = \sum_{k=0}^{K-\Delta_k-1} |S_\theta(k) - S'_\theta(k + \Delta_k)| \quad \text{(equation 3)}$$

The form of equation 3 yields a rotational angular movement (after mapping) as a positive quantity, i.e., rotation angle estimate $\tilde{\theta}\theta$ 329 is between (and may include 0) 0 and 360 degrees. Equation 4 below may also be used to capture the set of pce values. However, this may generate a rotation angle estimate $\tilde{\theta}\theta$ 329 (after mapping) that is between −180 and 180 degrees.

$$pce(\Delta_k) = \sum_{k=-\frac{K}{2}}^{\frac{K}{2}-\Delta_k-1} |S_\theta(k) - S'_\theta(k + \Delta_k)| \quad \text{(equation 4)}$$

Subsequent to all N frames being processed on one image-component (e.g., Y), it may be possible to add all the estimated rotation angles to the appropriate frames on the other image-components (e.g., Cb and Cr). This may happen because projections need only be generated for one image-component and the frame registration sequence is known beforehand via a frame flow-tree. This possible architecture configuration of frame registrator 330 is not shown. One configuration of frame registrator 330, which is shown in FIG. 13, may have up to three adders, for adding rotation angle estimate $\tilde{\theta}$ 329 to any of the image-components. Rotation angle estimate $\tilde{\theta}$ 329 may be routed to a first adder 390, and added to a base frame sfY_a to generate a registered frame sfY_a+$\tilde{\theta}$. Rotation angle estimate $\tilde{\theta}$ 329 may be routed to a second adder 392, and added to a base frame sfCb to generate a registered frame sfCb+$\tilde{\theta}$. Rotation angle estimate $\tilde{\theta}$ 329 may be routed to a third adder 394, and added to a base frame sfCr to generate a registered frame sfCr+$\tilde{\theta}$.

FIG. 14 illustrates a possible configuration of early terminator 332. An angle threshold 400, $\tilde{\theta}_{th}$, may be compared with a comparator 402 to rotation angle estimate $\tilde{\theta}$ 329. Comparator 402 may take the difference, $\tilde{\theta}-\tilde{\theta}_{th}$, and the sign-bit may be checked by sign-bit detector 404. When $\tilde{\theta}_{th}$ is greater than $\tilde{\theta}$, the difference is negative and the sign bit of the difference may be set. The setting of the sign-bit may trigger an early exit signal, and if desired stop the processing of the N unregistered frames.

FIG. 15 is a flow chart illustrating a possible method of frame registration of images. N frames are input 440 and control of frame selection 442 may be implemented as illustrated in the frame flow-trees disclosed in FIG. 5A-5F. Storing and fetching of image-component Y 444, storing and fetching of image component Cb 446, and storing and fetching of image-component Cr 448 may take place. Signals fsel_Y, fsel_Cb, and fsel_Cr may select which frames sfY_a (and optional sfY_b if a configuration such as shown in FIG. 3 is used), sfCb, and sfCr in accordance with a frame flow-tree such as disclosed in FIG. 5A-5F. A base frame and movement frame for at least one-image component may be selected. A region of interest (ROI) locator may identify a region of interest, and may segment the ROI into K sectors forming a circle 450. For any sector in a base frame and movement frame, projections may be generated 452 as disclosed above. Potentially, low pass filtering 454 may take place as disclosed previously. By summing the filtered or unfiltered projections of a sector, as was disclosed above, any of the K sectors may be radially integrated 456. Two vectors may be formed (as disclosed above) on the set of sum of projections and used for projection correlation 458. The projection correlation 458 may generate a set of pce values. The shift position (i.e., index) resulting from the selection of the minimum pce value 460, amongst the set of pce values, may be used to estimate the rotation angle between a base frame and a movement frame. The index of the minimum pce value is called θ factor, and may be mapped to an angle 462 as disclosed previously. As discussed above, rotation angle estimate $\hat{\theta}$ 329 may be generated from frame registration 464. There may be an early exit signal (although not explicitly illustrated) to terminate the method prior to N frames being processed.

For exemplary purposes, a graph 486 of the radial integrated outputs (for both a base frame and movement frame) versus k, an index tracking the number of sectors selected, is illustrated in FIG. 16A. The total number of sectors formed and selected, in this example, is K=1440. Similarly, for exemplary purposes, a graph 488 of the projection correlation between input vectors ($S_\theta$ and $S'_\theta$) is shown versus a mapped shift angle in FIG. 16B. The estimation rotation is 35 degrees and was obtain by using equation 1 above.

As mentioned previously, transformed pixels may also be used in a frame registration method or a frame registrator. Transformed pixels may be transformed by taking a transform that maps the pixels in the spatial domain to a spatial-frequency domain, such as a discrete cosine transform (DCT), or as shown in FIG. 17A and FIG. 17B a fourier transform. The fourier transform of a base frame 490 and fourier transform of a movement frame 492, are shown to illustrate that the rotation angle between a fourier transform in a base frame, and a fourier transform in a movement frame, may be estimated with the techniques and processes disclosed herein. One should note the rotated spectral pattern that can be seen between FIG. 17A and FIG. 17B.

FIG. 17C, displays a graph of the radial integration of both frames, and illustrates what the relative rotation angle estimate difference between the two frames is.

A number of different configurations and techniques have been described. The techniques may be improve removing blurriness from images with longer exposure times. The techniques and configurations may also aid in the reduction of hand jitter for practically any digital device that takes pictures. The techniques and configurations may be implemented in hardware, software, firmware, or any combination thereof. If implemented in software, the techniques and configurations may be directed to a non-transitory computer-readable medium comprising computer-readable program code (also may be called computer-code), that when executed in a device that takes pictures, performs one or more of the methods mentioned above.

The computer-readable program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components, such as projection correlation, to accelerate the frame registration process. The frame registration techniques and configurations disclosed may be implemented in one or more microprocessors, one or more application specific integrated circuits (ASICs), and one or more field programmable gate arrays (FPGAs), or some other hardware software combination. These techniques and configurations are within the scope of the following claims.

The invention claimed is:

1. An apparatus configured to process images, comprising:
   a region of interest locator for segmenting an image in a frame into a set of sectors which forms a circle;
   a projection generator configured to generate a plurality of projections in any sector from the set of sectors;
   a rotational integrator configured to generate a plurality of sums, wherein a sum is formed by adding the plurality of projections in the any sector;
   a memory for storing a first plurality of sums generated by the rotational integrator and a second plurality of sums generated by the rotational integrator;
   a projection correlator configured to compare the first plurality of sums with the second plurality of sums and configured to generate a set of projection correlation error (pce) values;
   a pce value index selector configured to select a minimum shift value determined by selecting a shift value that corresponds to the minimum pce value amongst the set of pce values;
   a look-up-table for mapping the minimum shift value to a rotation angle estimate between a first frame and a second frame; and
   a frame registrator configured to generate an updated base image-component comprising a first adder to add the rotation angle estimate to an image-component, wherein the frame registrator is further configured to generate an early exit signal comprising a detector for detecting a sign-bit output of a comparator for comparing the rotation angle estimate to a shift threshold.

2. The apparatus of claim 1, wherein the projection correlator comprises a shifter for shift aligning the set of the sum of projections from the base frame with the set of the sum of projections from the movement frame, where shift aligning includes shifting the position between two input vectors for each position between the two vectors.

3. The apparatus of claim 2, wherein the first plurality of sums is a first vector and the second plurality of sums is a second vector.

4. The apparatus of claim 3, wherein the projection correlator comprises a subtractor for performing a subtraction operation between the first vector and the second vector to generate a projection correlation error (pce) vector.

5. The apparatus of claim 4, wherein a norm of the pce vector is taken to generate a pce value.

6. The apparatus of claim 5, wherein the norm is an L1 norm.

7. The apparatus of claim 1, wherein the first frame and the second frame are selected based on a parity of a number of total frames to be processed in a row from a frame flow-tree, wherein the frame flow-tree includes a tree of frames where leaf nodes include unregistered frames and other nodes include registered frames that are based on their respective child nodes.

8. The apparatus claim 1, wherein the at least one set of projections from the first frame and the at least one set of projections from the second frame are low pass filtered before the plurality of sums is generated.

9. The apparatus of claim 1, wherein the at least one set of projections from the first frame and the at least one set of projections from the second frame are interpolated.

10. The apparatus of claim 1, wherein the frame registrator is further configured to generate at least one additional updated base image-component comprising at least one adder to add an image-component to the rotation angle estimate.

11. A method of registration of images comprising:
segmenting an image in a frame into a set of sectors which forms a circle;
generating a plurality of projections in any sector from the set of sectors in a first frame;
generating a plurality of projections in any sector from the set of sectors in a second frame;
generating a first plurality of sums, wherein a sum is formed by adding the plurality of projections in the any sector in the first frame;
generating a second plurality of sums, wherein a sum is formed by adding the plurality of projections in the any sector in the second frame;
comparing the first plurality of sums with the second plurality of sums, to generate a set of projection correlation error (pce) values;
selecting a minimum shift value determined by selecting a shift value that corresponds to the minimum pce value amongst the set of pce values;
mapping the minimum shift value to a rotation angle estimate between the first frame and the second frame; and
registering the second frame by adding the rotation angle estimate to the image-components of the first frame, wherein the registering stops when the rotation angle estimate is smaller than a threshold.

12. The method of claim 11, wherein the comparing further comprises taking the first plurality of sums and shift aligning them with the second plurality of sums, where shift aligning includes shifting the position between two input vectors for each position between the two vectors.

13. The method of claim 12, wherein the first plurality of sums is a vector and the second plurality of sums is a second vector.

14. The method of claim 13, wherein the first vector and the second vector are subtracted from each other to generate a pce vector.

15. The method of claim 14, wherein a norm of the pce vector is taken to generate a pce value.

16. The method of claim 15, wherein the norm is an L1 norm.

17. The method of claim 11, wherein the first frame and the second frame are selected based on a parity of a number of total frames to be processed in a row from a frame flow-tree, wherein the frame flow-tree includes a tree of frames where leaf nodes include unregistered frames and other nodes include registered frames that are based on their respective child nodes.

18. The method of claim 11, wherein the plurality of projections in any sector from the set of sectors in a first frame and the plurality of projections in any sector from the set of sectors in a second frame are low pass filtered.

19. The method of claim 11, wherein the plurality of projections in any sector from the set of sectors in a first frame and the plurality of projections in any sector from the set of sectors in a second frame are interpolated.

20. The method of claim 11, wherein the first frame and the second frame comprises pixels.

21. The method of claim 11, wherein the first frame and the second frame comprises spatial-frequency transformed pixels.

22. A non-transitory computer-readable medium embodying a set of instructions, wherein the set of instructions when executed by one or more processors comprises:
computer-readable program code means for segmenting an image in a frame into a set of sectors which forms a circle;
computer-readable program code means for generating a plurality of projections in any sector from the set of sectors in a first frame;
computer-readable program code means for generating a plurality of projections in any sector from the set of sectors in a second frame;
computer-readable program code means for generating a first plurality of sums, wherein a sum is formed by adding the plurality of projections in the any sector in the first frame;
computer-readable program code means for generating a second plurality of sums, wherein a sum is formed by adding the plurality of projections in the any sector in the second frame;
computer-readable program code means for comparing the first plurality of sums with the second plurality of sums, to generate a set of projection correlation error (pce) values;
computer-readable program code means for selecting a minimum shift value determined by selecting a shift value that corresponds to the minimum pce value amongst the set of pce values;
computer-readable program code means for mapping the minimum shift value to a rotation angle estimate between the first frame and the second frame; and
computer-readable program code means for registering the second frame by adding the rotation angle estimate to the image-components of the first frame, wherein the registering stops when the rotation angle estimate is smaller than a threshold.

23. The computer-readable medium of claim 22, wherein the comparing further comprises taking the first plurality of sums and shift aligning them with the second plurality of sums, where shift aligning includes shifting the position between two input vectors for each position between the two vectors.

24. The computer-readable medium of claim 23, wherein the first plurality of sums is a vector and the second plurality of sums is a second vector.

25. The computer-readable medium of claim 24, wherein the first vector and the second vector are subtracted from each other to generate a pce vector.

26. The computer-readable medium of claim 25, wherein a norm of the pce vector is taken to generate a pce value.

27. The computer-readable medium of claim 26, wherein the norm is an L1 norm.

28. The computer-readable medium of claim 22, wherein the first frame and the second frame are selected based on a parity of a number of total frames to be processed in a row from a frame flow-tree, wherein the frame flow-tree includes a tree of frames where leaf nodes include unregistered frames and other nodes include registered frames that are based on their respective child nodes.

29. The computer-readable medium of claim 22, wherein the plurality of projections in any sector from the set of sectors in a first frame and the plurality of projections in any sector from the set of sectors in a second frame are low pass filtered.

30. The computer-readable medium of claim 22, wherein the plurality of projections in any sector from the set of sectors in a first frame and the plurality of projections in any sector from the set of sectors in a second frame are interpolated.

31. The computer-readable medium of claim 22, wherein the first frame and the second frame comprises pixels.

32. The computer-readable medium of claim 22, wherein the first frame and the second frame comprises spatial-frequency transformed pixels.

33. An apparatus configured to process images, comprising:

- means for segmenting an image in a frame into a set of sectors which forms a circle;
- means for generating a plurality of projections in any sector from the set of sectors in a first frame;
- means for generating a plurality of projections in any sector from the set of sectors in a second frame;
- means for generating a first plurality of sums, wherein a sum is formed by adding the plurality of projections in the any sector in the first frame;
- means for generating a second plurality of sums, wherein a sum is formed by adding the plurality of projections in the any sector in the second frame;
- means for comparing the first plurality of sums with the second plurality of sums, to generate a set of projection correlation error (pce) values;
- means for selecting a minimum shift value determined by selecting a shift value that corresponds to the minimum pce value amongst the set of pce values;
- means for mapping the minimum shift value to a rotation angle estimate between the first frame and the second frame; and
- means for registering the second frame by adding the rotation angle estimate to the image-components of the first frame, wherein the registering stops when the rotation angle estimate is smaller than a threshold.

34. The apparatus of claim 33, wherein the means for comparing further comprises taking the first plurality of sums and shift aligning them with the second plurality of sums, where shift aligning includes shifting the position between two input vectors for each position between the two vectors.

* * * * *